United States Patent
Shekhar et al.

(10) Patent No.: US 11,948,387 B2
(45) Date of Patent: Apr. 2, 2024

(54) OPTIMIZED POLICY-BASED ACTIVE LEARNING FOR CONTENT DETECTION

(71) Applicant: ADOBE INC., San Jose, CA (US)

(72) Inventors: Sumit Shekhar, Bengaluru (IN); Bhanu Prakash Reddy Guda, Podili (IN); Ashutosh Chaubey, Chhattisgarh (IN); Ishan Jindal, Mansa (IN); Avneet Jain, Madhya Pradesh (IN)

(73) Assignee: ADOBE INC., San Jose, CA (US)

( * ) Notice: Subject to any disclaimer, the term of this patent is extended or adjusted under 35 U.S.C. 154(b) by 584 days.

(21) Appl. No.: 17/170,307

(22) Filed: Feb. 8, 2021

(65) Prior Publication Data

US 2022/0253630 A1 Aug. 11, 2022

(51) Int. Cl.
| | | |
|---|---|---|
| *G06V 40/10* | (2022.01) | |
| *G06F 18/21* | (2023.01) | |
| *G06F 18/211* | (2023.01) | |
| *G06F 18/214* | (2023.01) | |
| *G06N 20/00* | (2019.01) | |
| *G06V 20/20* | (2022.01) | |

(52) U.S. Cl.
CPC ............ *G06V 40/10* (2022.01); *G06F 18/211* (2023.01); *G06F 18/2155* (2023.01); *G06F 18/2178* (2023.01); *G06N 20/00* (2019.01); *G06V 20/20* (2022.01)

(58) Field of Classification Search
CPC ............... G06F 18/211; G06F 18/2155; G06F 18/2178; G06V 20/20; G06V 40/10; G06N 20/00
See application file for complete search history.

(56) References Cited

U.S. PATENT DOCUMENTS

| | | | | |
|---|---|---|---|---|
| 10,467,274 | B1 * | 11/2019 | Ren | G06N 3/006 |
| 10,766,136 | B1 * | 9/2020 | Porter | G06N 3/045 |
| 2022/0189170 | A1 * | 6/2022 | Zhu | G06V 10/776 |
| 2022/0318621 | A1 * | 10/2022 | Gong | G06N 3/006 |

OTHER PUBLICATIONS

Uzkent, et al. (Efficient Object detection in Large Images Using Deep Reinforcement Learning), pp. 1824-1833. (Year: 2020).*
Aggarwal, et al., "Active Learning: A Survey", CRC Press, 2014, pp. 571-605.

(Continued)

*Primary Examiner* — Daniel G Mariam
(74) *Attorney, Agent, or Firm* — F. CHAU & ASSOCIATES, LLC

(57) ABSTRACT

Systems and methods for training an object detection network are described. Embodiments train an object detection network using a labeled training set, wherein each element of the labeled training set includes an image and ground truth labels for object instances in the image, predict annotation data for a candidate set of unlabeled data using the object detection network, select a sample image from the candidate set using a policy network, generate a labeled sample based on the selected sample image and the annotation data, wherein the labeled sample includes labels for a plurality of object instances in the sample image, and perform additional training on the object detection network based at least in part on the labeled sample.

17 Claims, 14 Drawing Sheets

(56) References Cited

OTHER PUBLICATIONS

Aghdam, et al., "Active Learning for Deep Detection Neural Networks", 2019 IEEE/CVF International Conference on Computer Vision (ICCV), 2019, 9 pages.

Brust, et al., "Active Learning for Deep Object Detection", Proceedings of the 14th International Joint Conference on Computer Vision, Imaging and Computer Graphics Theory and Applications, 2019, 11 pages.

Brust, et al., "Active and Incremental Learning with Weak Supervision", KI—Künstliche Intelligenz, 2020, 34(2):165-180.

Casanova, et al., "Reinforced Active Learning for Image Segmentation", In International Conference on Learning Representations, 2020, 17 pages.

Desai, et al., "An Adaptive Supervision Framework for Active Learning in Object Detection", In BMVC, 2019, 13 pages.

Devlin, et al., "BERT: Pre-training of Deep Bidirectional Transformers for Language Understanding", In Proceedings of the 2019 Conference of the North American Chapter of the Association for Computational Linguistics: Human Language Technologies, vol. 1 (Long and Short Papers), 2019, pp. 4171-4186, Minneapolis, Minnesota: Association for Computational Linguistics.

Ducoffe, et al., "Adversarial Active Learning for Deep Networks: a Margin Based Approach", 2018, 10 pages.

Everingham, et al., 'The PASCAL Visual Object Classes Challenge 2007 (VOC2007) Results', Information can be found on the internet at: http://host.robots.ox.ac.uk/pascal/VOC/voc2007/.

Fang, et al., "Learning how to Active Learn: A Deep Reinforcement Learning Approach", Proceedings of the 2017 Conference on Empirical Methods in Natural Language Processing, 2017, 11 pages.

Freytag, et al., "Selecting Influential Examples: Active Learning with Expected Model Output Changes", In Fleet, D.; Pajdla, T.; Schiele, B.; and Tuytelaars, T., eds., Computer Vision—ECCV 2014, pp. 562-577, Cham: Springer International Publishing.

Gal, et al., "Deep Bayesian Active Learning with Image Data", In Precup, D., and Teh, Y. W., eds., Proceedings of the 34th International Conference on Machine Learning, vol. 70 of Proceedings of Machine Learning Research, pp. 1183-1192, 2017, International Convention Centre, Sydney, Australia: PMLR.

Haussmann, et al., "Deep Active Learning with Adaptive Acquisition", Proceedings of the Twenty-Eighth International Joint Conference on Artificial Intelligence, 2019, 7 pages.

He, et al., "Deep Residual Learning for Image Recognition", 2015, 9 pages.

Houlsby, et al., "Collaborative Gaussian Processes for Preference Learning", In Pereira, F.; Burges, C. J. C.; Bottou, L.; and Weinberger, K. Q., eds., Advances in Neural Information Processing Systems 25. Curran Associates, Inc., 2012, pp. 2096-2104.

Huang, et al., "Bidirectional LSTM-CRF Models for Sequence Tagging", arXiv preprint arXiv:1508.01991, 2015, 10 pages.

Lin, et al., "Microsoft COCO: Common Objects in Context", In European conference on computer vision, 2014, pp. 740-755, Springer.

Liu, et al., "Deep Reinforcement Active Learning for Human-In-The-Loop Person Re-Identification", In 2019 IEEE/CVF International Conference on Computer Vision (ICCV), 2019, pp. 6121-6130.

Liu, et al., "Learning How to Actively Learn: A Deep Imitation Learning Approach", In Proceedings of the 56th Annual Meeting of the Association for Computational Linguistics (vol. 1: Long Papers), 2018, pp. 1874-1883, Melbourne, Australia: Association for Computational Linguistics.

Liu, et al., "Learning to Actively Learn Neural Machine Translation", In Proceedings of the 22nd Conference on Computational Natural Language Learning, 2018, pp. 334-344, Brussels, Belgium: Association for Computational Linguistics.

Mayer, et al., "Adversarial Sampling for Active Learning", 2020 IEEE Winter Conference on Applications of Computer Vision (WACV), 2020, pp. 3060-3068.

Mnih, et al., "Playing Atari with Deep Reinforcement Learning", ArXiv abs/1312.5602, 2013, 9 pages.

Papadopoulos, et al., "We don't need no bounding-boxes: Training object class detectors using only human verification", In 2016 IEEE Conference on Computer Vision and Pattern Recognition (CVPR), 2016, pp. 854-863.

Papadopoulos, et al., "Training object class detectors with click supervision", 2017 IEEE Conference on Computer Vision and Pattern Recognition (CVPR) 2017, 10 pages.

Ramshaw, et al., "Text Chunking using Transformation-Based Learning", In Natural language processing using very large corpora, Springer, 1995, pp. 157-176.

Ren, et al., "Faster R-CNN: Towards Real-Time Object Detection with Region Proposal Networks", In Cortes, C.; Lawrence, N. D.; Lee, D. D.; Sugiyama, M.; and Garnett, R., eds., Advances in Neural Information Processing Systems 28, Curran Associates, Inc., 2015, pp. 91-99.

Roy, et al., "Deep active learning for object detection", In BMVC, 91, 2018, 12 pages.

Settles, "Active Learning Literature Survey", Technical report, University of Wisconsin-Madison Department of Computer Sciences, 2009, 46 pages.

Shannon, "A Mathematical Theory of Communication", ACM SOGMOBILE mobile computing and communications review 5(1):3-55, 2001.

Shen, et al., "Deep Active Learning for Named Entity Recognition", Proceedings of the 2nd Workshop on Representation Learning for NLP, 2017, 15 pages.

Su, et al., "Crowdsourcing Annotations for Visual Object Detection", 2012, 7 pages.

Tjong Kim Sang, et al., "Introduction to the CoNLL-2003 Shared Task: Language-Independent Named Entity Recognition", In Proceedings of the seventh conference on Natural language learning at HLT-NAACL 2003—vol. 4, 2003, pp. 142-147.

Tkaczyk, et al., Grotoap2—the methodology of creating a large ground truth dataset of scientific articles. D-Lib Mag. 20. 2014, Found at the internet: http://www.dlib.org/dlib/november14/tkaczyk/11tkaczyk.html.

Wang, et al., "A new active labeling method for deep learning", In 2014 International Joint Conference on Neural Networks, (IJCNN), 2014, pp. 112-119.

Wang, et al., Cost-Effective Active Learning for Deep Image Classification, IEEE Transactions on Circuits and Systems for Video Technology 27(12):2591-2600, 2017.

Yoo, et al., "Learning Loss for Active Learning", 2019 IEEE/CVF Conference on Computer Vision and Pattern Recognition (CVPR), 2019, 10 pages.

Zhong, et al., "PubLayNet: largest dataset ever for document layout analysis", In 2019 International Conference on Document Analysis and Recognition (ICDAR), 2019, pp. 1015-1022, IEEE.

\* cited by examiner

Algorithm 1 Training the Policy DQN, $\Pi$

Input: Unlabelled pool of data $\mathcal{X}_u$, policy training set $\mathcal{X}_{tr}$, state representation set $\mathcal{X}_{state}$, metric set $\mathcal{X}_{met}$, budget $\mathbb{B}$.
Output: Policy DQN, $\Pi$ trained for querying samples for annotation.

1: Initialize policy and target DQN
2: Initialize memory replay buffer $\mathbb{M}$
3: while convergence of DQN loss do
4:     Initialize $\Theta$
5:     Randomly sample $n_{init}$ samples from $\mathcal{X}_u$ and add to $\mathcal{X}_l$
6:     Train the model $\Theta$ on $\mathcal{X}_l$
7:     Compute the metric on $\mathcal{X}_{met}$
8:     while Consumption of budget $\mathbb{B}$ do
9:         Sample $n_{pool} \times n_{cycle}$ number of samples from $\mathcal{X}_u$ as candidates for labeling $\mathcal{X}_{cand}$
10:         Compute state representation $S_t$ using predictions of model $\Theta$ on $\mathcal{X}_{state}$ and $\mathcal{X}_{cand}$
11:         Select $n_{cycle}$ samples from $\mathcal{X}_{cand}$ using $\epsilon$-greedy policy and add it to $\mathcal{X}_l$ - Action $A_t$
12:         Retrain the model $\Theta$ on $\mathcal{X}_l$
13:         Compute the metric on the $\mathcal{X}_{met}$
14:         Compute the reward $\mathcal{R}_t$ as the difference in metric
15:         Re-do steps 11 and 12 - Next State $S_{t+1}$
16:         Add tuple $(S_t, A_t, \mathcal{R}_t, S_{t+1})$ to memory replay buffer $\mathbb{M}$
17:         Optimize policy DQN, $\Pi$
18:     end while
19: end while

| Notations | Description |
|---|---|
| $\mathcal{X}_u, \mathcal{X}_l$ | Unlabelled and labelled set |
| $\mathcal{X}_{train}, \mathcal{X}_{test}$ | Policy training set and testing set |
| $\mathcal{X}_{cand}$ | Candidate unlabelled examples for an active learning cycle |
| $\mathcal{X}_{met}, \mathcal{X}_{state}$ | Metric calculation and state representation set |
| $A_t, S_t, \mathcal{R}_t$ | Action, state and reward at time $t$ |
| $\Pi, \Theta$ | Policy deep Q network and Prediction model to be trained |
| $\mathbb{M}, \mathbb{B}$ | Memory buffer for Q learning, Total budget for active learning |
| $n_{cycle}, n_{pool}, n_{init}$ | Number of samples to be acquired in one active learning cycle, Number of samples in a pool, Number of samples labeled for initial training |

FIG. 14

OPTIMIZED POLICY-BASED ACTIVE LEARNING FOR CONTENT DETECTION

BACKGROUND

The following relates generally to object detection, and more specifically to object detection using machine learning.

In the field of computer vision, object detection refers to the task of identifying objects or object instances from a digital photograph. Object detection tasks involve both image classification and object localization. In some examples, image classification involves assigning a class label to an image or an object in an image, whereas object localization involves drawing a bounding box around one or more objects in an image. Object detection combines these two tasks and draws a bounding box around each object of interest in the image and assigns these objects a class label.

Training an object detection models typically depends on a large amount of labeled training data. However, obtaining this data can be costly and time consuming. As a result, these system are not generalizable to various tasks without spending considerable time and effort to annotate unlabeled data. Therefore, there is a need in the art for improved object detection systems that can be trained using a reduced number of labeled training examples.

SUMMARY

The present disclosure describes systems and methods for object detection. Embodiments of the disclosure provide an object detection apparatus that uses a machine learning model to identify object instances of an image. In some embodiments, an active learning network is used to select additional training examples from the output of an object detection network. For example, a policy network of the object detection apparatus may be configured to select sample data to be included in a labeled training set. In some examples, a user can verify or make changes to the annotation data of the selected sample data through an annotation interface.

A method, apparatus, and non-transitory computer readable medium for training an object detection network are described. Embodiments of the method, apparatus, and non-transitory computer readable medium are configured to train an object detection network using a labeled training set, wherein each element of the labeled training set includes an image and ground truth labels for object instances in the image, predict annotation data for a candidate set of unlabeled data using the object detection network, select a sample image from the candidate set using a policy network, generate a labeled sample based on the selected sample image and the annotation data, wherein the labeled sample includes labels for a plurality of object instances in the sample image, and perform additional training on the object detection network based at least in part on the labeled sample.

A method, apparatus, and non-transitory computer readable medium for object detection are described. Embodiments of the method, apparatus, and non-transitory computer readable medium are configured to receive an image comprising a plurality of instances of an object, generate annotation data for the image using an object detection network that is trained at least in part together with a policy network that selects predicted output from the object detection network for use in training the object detection network, and identify each of the instances based on the annotation data.

An apparatus and method for object detection are described. Embodiments of the apparatus and method include an object detection network configured to detect instances of one or more objects and a policy network configured to select outputs from the object detection network for use in subsequent training of the object detection network, wherein the policy network is trained based on a reward function determined based on changes in a performance of the object detection network after the subsequent training.

BRIEF DESCRIPTION OF THE DRAWINGS

FIG. 14 shows an example of an algorithm for training a policy network according to aspects of the present disclosure.

DETAILED DESCRIPTION

Figure 1:
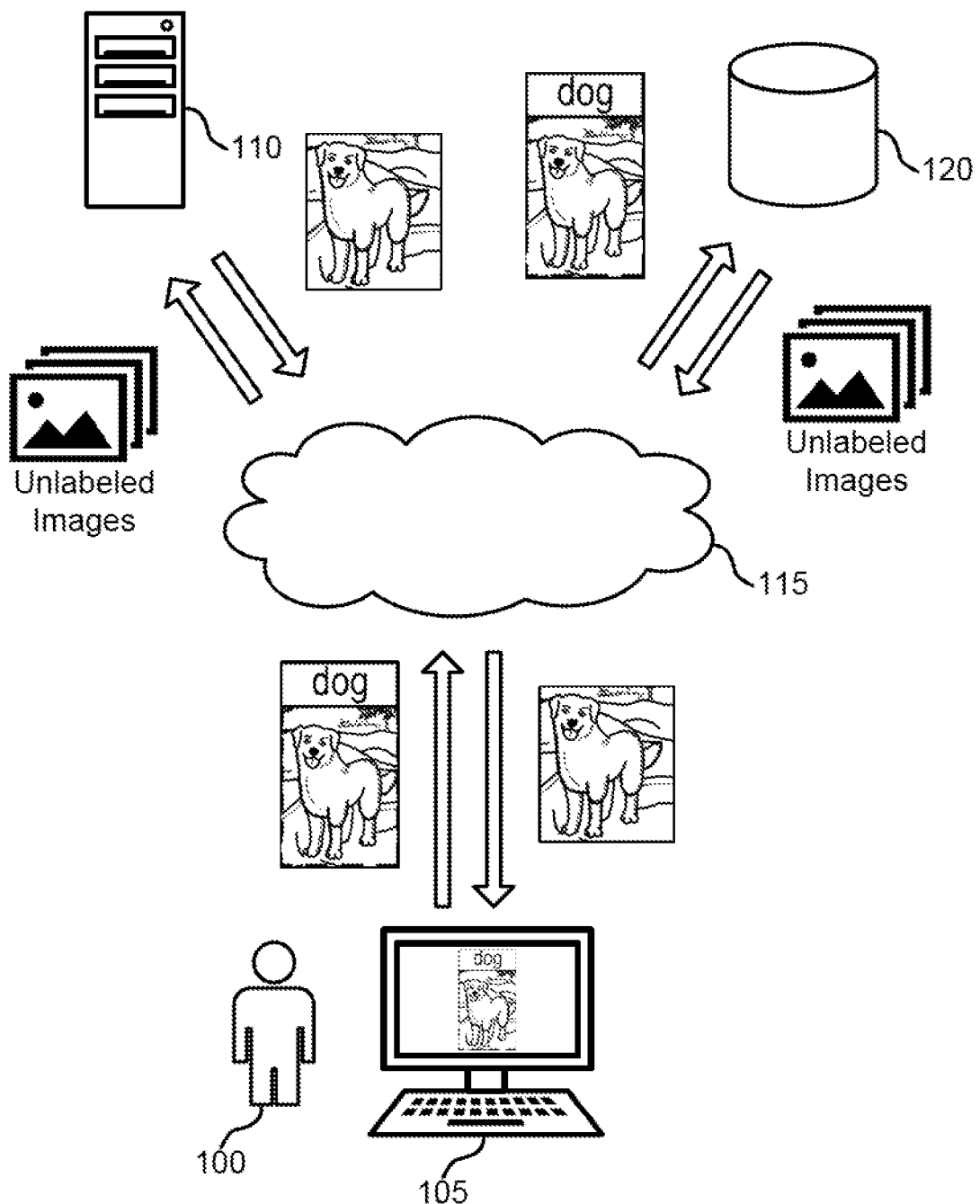
FIG. 1 shows an example of a system for object detection according to aspects of the present disclosure.

The present disclosure describes systems and methods for object detection. In some embodiments, a reinforcement learning network is used to select additional training examples from the output of an object detection network. For example, a policy network of the object detection apparatus may be configured to select sample data to be included in a labeled training set.

Training an object detection model typically depends on a large amount of labeled training data, which can be costly and time consuming to obtain. Recently, active learning approaches have been used to train machine learning models with a limited annotation budget. Active learning refers to a machine learning model that is able to select training samples to learn from.

However, active learning models typically depend on uncertainty estimates based on information theory, for designing acquisition functions for active learning. In many cases, these models are not able to aggregate the uncertainties over various entities present in a data sample. Therefore, active learning models are typically limited to tasks where there is a single label per data sample. As such, they may not be suitable for tasks such as object detection or named entity recognition (NER), where there are multiple annotations within a same sample.

Embodiments of the present disclosure provide an improved object detection apparatus. An object detection system described herein utilizes a robust policy-based method for active learning. The active learning task is modeled as a Markov decision process (MDP) and learns an optimal acquisition function (e.g., using deep Q-learning). In some embodiments, the object detection apparatus includes a deep query sampling network optimized for performance metrics of the underlying prediction network. In one embodiment, the improved object detection system incorporates human feedback into MDP using suitable reward functions to increase the performance of the policy-based active learning approach.

In some embodiments, weak labeling techniques (i.e., presenting a portion of the annotation data generated by an object detection network to a human annotator) are combined with active learning. The weak labeling techniques may make use of annotator feedback (e.g., from annotator's corrections of detected instance boundaries) during an active learning cycle. In one example, weak labeling is used to reduce the annotation cost. When there are multiple entities that an annotator may account for in a data sample, weak labeling can significantly reduce the annotation effort, through providing faster variations of annotation techniques or asking an annotator to verify predictions made by the object detection apparatus.

Embodiments of the present disclosure may be used in the context of a vision-based object detection or named entity recognition. For example, an object network apparatus based on the present disclosure may take an image including a set of object instances, and efficiently detect and label each object instance. An example of an application of the inventive concept in the object detection context is provided with reference to FIGS. 1 and 2. Details regarding the architecture of an example object detection apparatus are provided with reference to FIGS. 3, 4 and 5. An example of a process for object detection is provided with reference to FIG. 6. An example of a process for selecting a sample image using a policy network is provided with reference to FIG. 7. Details regarding an annotation interface and a process of using the annotation interface are provided with reference to FIGS. 8, 9, and 10. A description of an example training process for an object detection network is described with reference to FIG. 11. A description of an example training process for a policy network is described with reference to FIGS. 12, 13 and 14.

Object Detection System

FIG. 1 shows an example of a system for object detection according to aspects of the present disclosure. The example shown includes user 100, user device 105, object detection apparatus 110, cloud 115, and database 120. Object detection apparatus 110 is an example of, or includes aspects of, the corresponding element described with reference to FIG. 3.

In the example of FIG. 1, a database 120 stores both labeled and unlabeled training images. The labeled images may be used to train the object detection apparatus 110. Then, the unlabeled images are passed to the object detection apparatus 110 as input. In some cases, the images are accessed via the could 115.

In an example, the object detection apparatus 110 receives an image including one or more of instances of an object. For example, an unlabeled image may include a dog and the surrounding landscape. The object detection apparatus 110 generates annotation data for the image (i.e., a box surrounding the dog, and a label, "dog"). Then a policy network of the object detection apparatus 110 identifies the newly labeled image as an image that should be used for training. For example, a policy network of the object detection apparatus 110 selects sample images to be annotated through an annotation interface operated by a human annotator (e.g., the user 100).

Once the policy network identifies an image for training, the user 100 may generate or verify the annotation information. The user 100 may view the sample images and make changes to the annotations associated with each of the sample images displayed on the user device 105. The user 100 communicates with the object detection apparatus 110 via the user device 105 and the cloud 115. Then, these annotated samples or labeled samples become a part of an updated labeled set which is then used for training the object detection apparatus 110.

In the example illustrated in FIG. 1, a sample image selected by the policy network includes at least one object instance (e.g., the dog). However, embodiments of the present disclosure are not limited thereto, and each image of the sample images can have more than one object instance for detection, classification, and identification.

The user 100 annotates the sample images selected by the policy network. The user device 105 may be a personal computer, laptop computer, mainframe computer, palmtop computer, personal assistant, mobile device, or any other suitable processing apparatus. In some examples, the user device 105 includes an annotation interface where the user can choose to draw, select, and annotate object instances with a text description and a bounding box. In some cases, the user can verify and correct existing annotations on a sample image. A description of an example annotation interface is described with reference to FIGS. 9 and 10.

The object detection apparatus 110 identifies each of the instances and generates annotation data. According to the example above, the object instance "dog" is detected by the object detection apparatus 110. However, some or all of the annotation data may be withheld from the user during the annotation stage. In some examples, an object detection network is configured to detect instances of one or more objects, where each object instance is identified using a bounding box or a text description. The process of using the object detection apparatus 110 to perform object detection is further described with reference to FIG. 2.

In some embodiments, the object detection apparatus 110 trains a policy based sampling network to select samples for training a underlying object detection network (i.e., a prediction network). One embodiment of the present disclosure uses a weak labeling technique (i.e., providing partial annotation data to a human annotator) to significantly reduce the cost of annotation. The object detection apparatus 110 may receive user feedback via an annotation interface. Unlike existing technologies that depend on task-specific heuristics, the object detection apparatus 110 is generalizable across different content detection tasks.

According to some embodiments of the present disclosure, the object detection apparatus 110 includes a computer implemented artificial neural network (ANN) that generates annotation data for images. The object detection apparatus 110 may also include an ANN (e.g., a policy network) that learns to identify which samples would be useful for further training of the underlying prediction network.

An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

Accordingly, in some examples, the object detection apparatus 110 includes a deep neural network configured to solve complex tasks of content detection, such as vision-based object detection or named entity recognition. In some cases, these tasks depend on the availability of a large amount of labeled training data. The object detection apparatus 110 uses active learning techniques to maintain a balance between the overall budget of annotation and the performance of the underlying deep learning model (i.e., the object detection network). Unlike existing technologies, the object detection apparatus 110 is not dependent on heuristic algorithms that choose samples to be acquired at a particular active learning cycle.

According to some embodiments, the policy-based active learning approach is combined with weak supervision, reducing the annotation cost compared to strong supervision. In some cases, the object detection apparatus 110 uses a policy-based task-agnostic approach for active learning in complex deep learning tasks. The system increases the effectiveness through incorporating class balance and human feedback rewards in learning better active learning policy. The efficacy of the approach is evaluated on diverse tasks such as object detection, document layout detection and named entity recognition.

According to some embodiments of the present disclosure, the object detection apparatus 110 includes a computer implemented reinforcement learning algorithm for training the policy network of the object detection apparatus 110. In some cases, the reward is based at least in part on a class balance reward. Reinforcement learning is one of three basic machine learning paradigms, alongside supervised learning and unsupervised learning. Active learning is a form of machine learning which is used to identify examples for labeling to train model within a provided annotation budget.

In general, reinforcement learning relates to how software agents make decisions to maximize a reward. The decision making model may be referred to as a policy. This type of learning differs from supervised learning in that labeled training data is not needed, and errors need not be explicitly corrected. Instead, reinforcement learning balances exploration of unknown options and exploitation of existing knowledge. In some cases, the reinforcement learning environment is stated in the form of a Markov decision process (MDP). Furthermore, many reinforcement learning algorithms utilize dynamic programming techniques. However, one difference between reinforcement learning and other dynamic programming methods is that reinforcement learning does not depend on an exact mathematical model of the MDP. Therefore, reinforcement learning models may be used for large MDPs where exact methods are impractical.

The object detection apparatus 110 may also include a processor unit, a memory unit, and a training component. The training component is used to train an object detection network of the object detection apparatus 110. Additional details regarding the architecture of an example object detection apparatus 110 are provided with reference to FIGS. 3, 4, and 5, and an example of a process for using the object detection apparatus 110 is provided with reference to FIG. 6.

In some cases, the object detection apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

A cloud 115 is a computer network configured to provide on-demand availability of computer system resources, such as data storage and computing power. In some examples, the cloud 115 provides resources without active management by the user. The term cloud 115 is sometimes used to describe data centers available to many users over the Internet. Some large cloud 115 networks have functions distributed over multiple locations from central servers. A server is designated an edge server if it has a direct or close connection to a user. In some cases, a cloud 115 is limited to a single organization. In other examples, the cloud 115 is available to many organizations. In one example, a cloud 115 includes a multi-layer communications network comprising multiple edge routers and core routers. In another example, a cloud 115 is based on a local collection of switches in a single physical location.

A database 120 is an organized collection of data. For example, a database 120 stores data in a specified format known as a schema. A database 120 may be structured as a single database, a distributed database, multiple distributed databases, or an emergency backup database. In some cases, a database controller may manage data storage and processing in a database 120. In some cases, a user 100 interacts with database controller. In other cases, database controller may operate automatically without user interaction.

According to some embodiments, database 120 is configured to store labeled training data and unlabeled training data for training the object detection network and the policy network.

Figure 2:
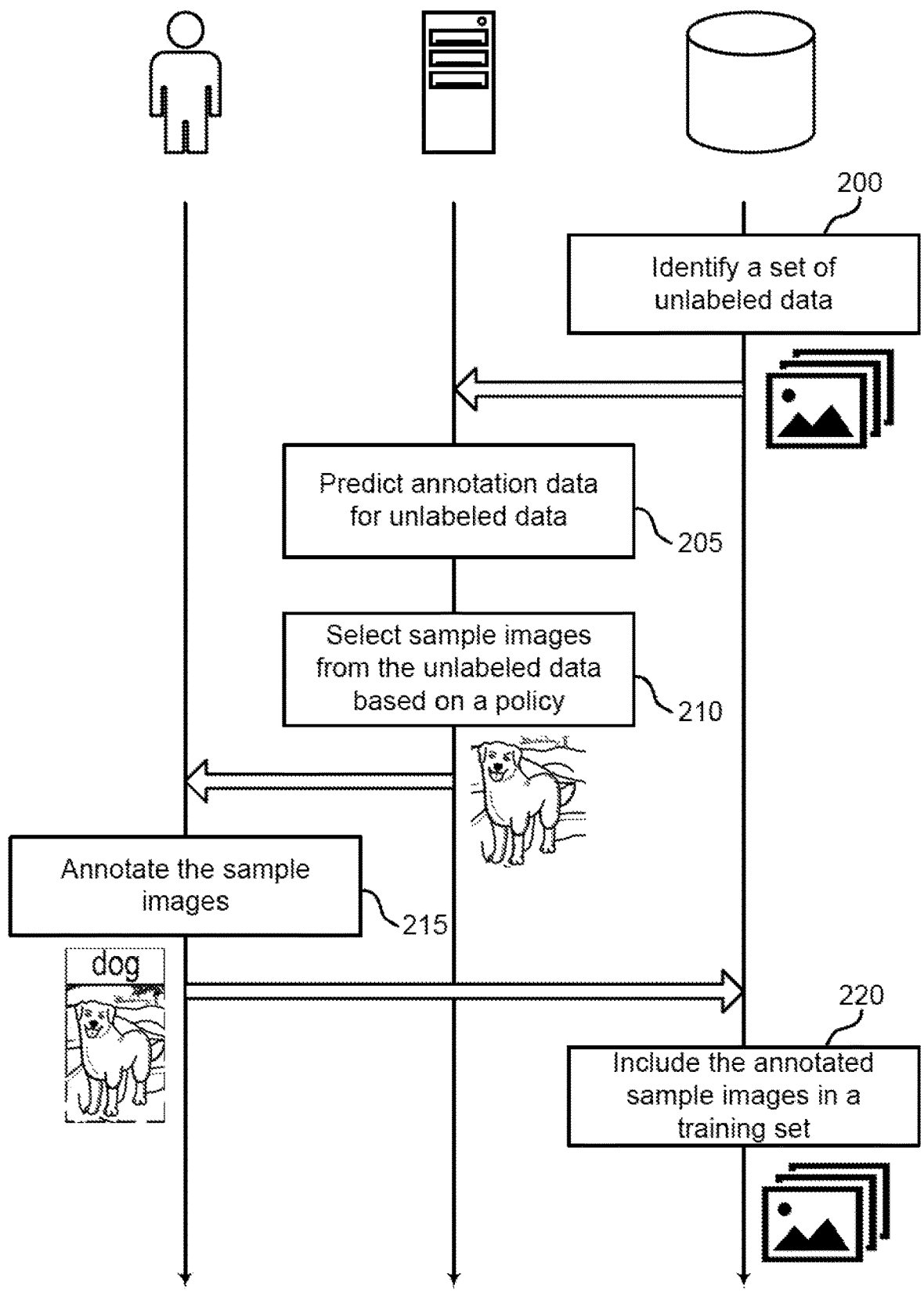
FIG. 2 shows an example of a process for object detection according to aspects of the present disclosure.

FIG. 2 shows an example of a process for object detection according to aspects of the present disclosure. In some examples, these operations are performed by a system such as the object detection system of claim 13. The system may include a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 200, the system identifies a set of unlabeled data. The unlabeled data is stored in a database as described in FIG. 1. The unlabeled data are not yet annotated. Each of the unlabeled images includes at least one object or object instance. The unlabeled images are input to an object detection network through a cloud. For example, the unlabeled data include a set of image files. In some cases, the operations of this step refer to, or may be performed by, a database as described with reference to FIG. 1.

At operation 205, the system predicts annotation data for unlabeled data. In some cases, candidate samples are chosen randomly from the unlabeled data to form a candidate set. The candidate set is input to the object detection network of the system, which detects object instances of the image and predicts annotation data. In some cases, the operations of this step refer to, or may be performed by, an object detection network as described with reference to FIGS. 3 and 4.

At operation 210, the system selects sample images from the unlabeled data based on a policy. A policy network of the system iteratively selects samples images from the unlabeled data that can increase the performance of the object detection network (i.e., underlying prediction model) until all the fixed annotation budget is consumed. The policy network is configured to select the sample images that need to be labeled to increase the performance of the object detection network by a maximum amount. According to an example, a sample image having a "dog" object instance is selected by the policy network. In some cases, the operations of this step refer to, or may be performed by, a policy network as described with reference to FIGS. 3 and 4.

At operation 215, the user annotates the sample images. According to the example, the annotator is shown the sample image having the "dog" object instance along with the model prediction (i.e., the object detection network predicts the object instance to be dog). The user can choose to verify the model prediction. In some examples, the model prediction may be incorrect and the user can correct the model prediction or the system's annotations. Additionally or alternatively, the user can choose to draw new entities (e.g., draw a new box circling an entity). In some cases, the user is presented with all of the annotations predicted by the system. In some other cases, a portion of the annotations generated by the prediction model is shown to the user for verification or annotation (e.g., the top two or three most confident annotations). In some cases, the operations of this step refer to, or may be performed by, a user using an annotation interface as described with reference to FIGS. 3, 4, and 9.

At operation 220, the system includes the annotated sample images in a training set. The training set is stored in the database as described in FIG. 1. The training set includes the newly annotated or labeled sample images, in which the annotations have been verified or corrected at previous operation 215. The training set is used to retrain the object detection network. In some cases, the operations of this step refer to, or may be performed by, a database as described with reference to FIG. 1.

Network Architecture

Figure 3:
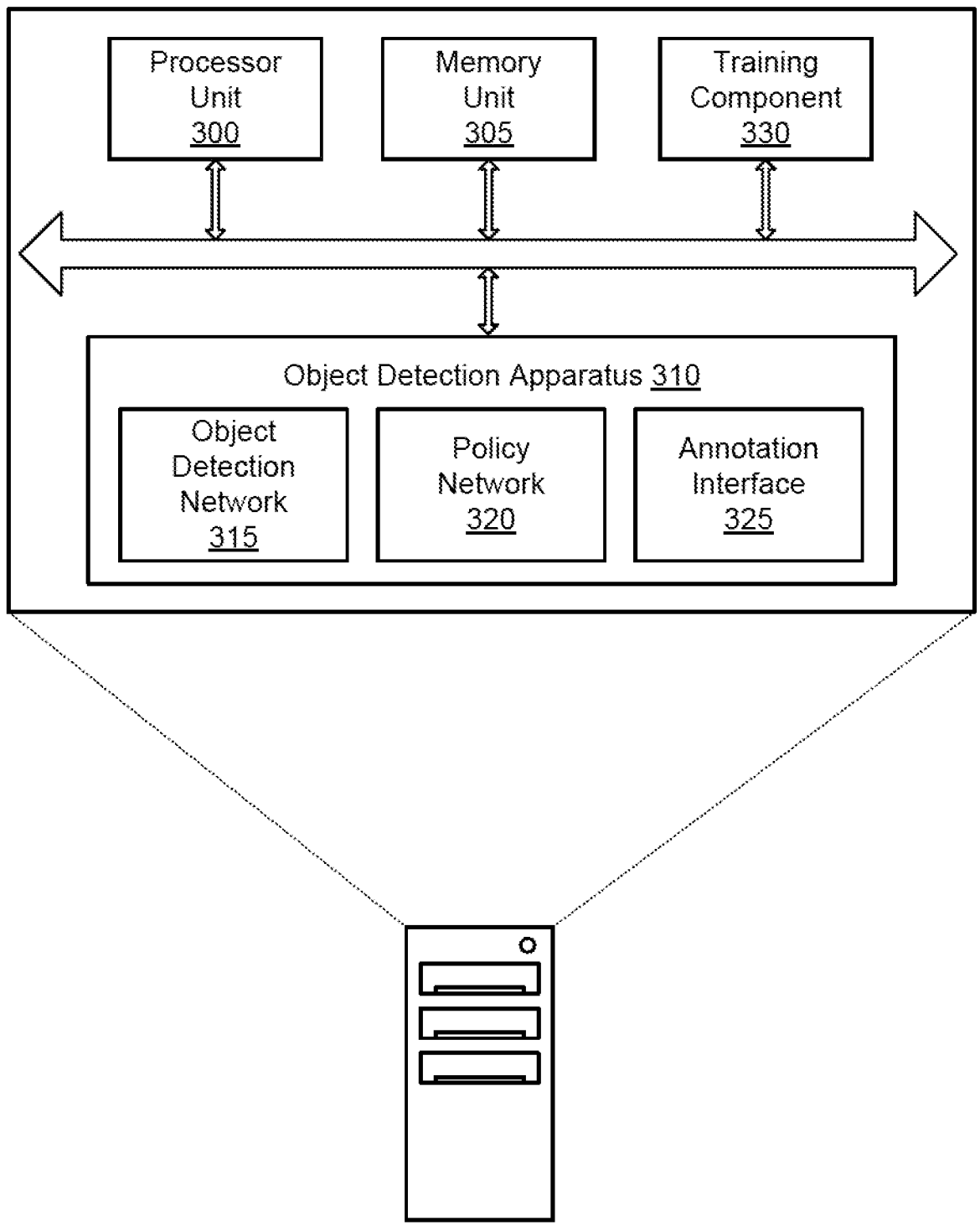
FIG. 3 shows an example of an apparatus for object detection according to aspects of the present disclosure.

FIG. 3 shows an example of an apparatus for object detection according to aspects of the present disclosure. The example shown includes processor unit 300, memory unit 305, object detection apparatus 310, and training component 330. Object detection apparatus 310 is an example of, or includes aspects of, the corresponding element described with reference to FIG. 1.

In one embodiment, object detection apparatus 310 includes object detection network 315, policy network 320, and annotation interface 325. According to this embodiment, an object detection network 315 is configured to detect instances of one or more objects and a policy network 320 is configured to select outputs from the object detection network for use in subsequent training of the object detection network, wherein the policy network is trained based on a reward function determined based on changes in a performance of the object detection network after the subsequent training.

A processor unit 300 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 300 is configured to operate a memory array using a memory controller. In other cases, a memory controller is integrated into the processor unit 300. In some cases, the processor unit 300 is configured to execute computer-readable instructions stored in a memory to perform various functions. In some embodiments, a processor unit 300 includes special purpose components for modem processing, baseband processing, digital signal processing, or transmission processing.

Examples of a memory unit 305 include random access memory (RAM), read-only memory (ROM), or a hard disk. Examples of memory unit 305 include solid state memory and a hard disk drive. In some examples, memory unit 305 is used to store computer-readable, computer-executable software including instructions that, when executed, cause a processor to perform various functions described herein. In some cases, the memory unit 305 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 305 store information in the form of a logical state.

According to some embodiments, object detection network 315 predicts annotation data for a candidate set of unlabeled data. In some examples, object detection network 315 predicts additional annotation data for a state set, where the sample image is selected based on the additional annotation data. In some examples, object detection network 315 generates first metric annotation data for a metric set prior to the additional training. Object detection network 315 then generates second metric annotation data for the metric set after the retraining. In some other examples, object detection network 315 predicts additional annotation data for a state set of unlabeled data. In some examples, the annotation data includes bounding boxes for the object instances.

According to some embodiments, object detection network 315 receives an image including a set of instances of an object. In some examples, object detection network 315 generates annotation data for the image and the object detection network 315 is trained at least in part together with a policy network 320 that selects predicted output from the object detection network 315 for use in training the object detection network 315. Object detection network 315 identifies each of the instances based on the annotation data.

According to some embodiments, object detection network 315 is configured to detect instances of one or more objects. In some examples, the object detection network 315 is trained using a supervised learning algorithm based on the outputs selected by the policy network 320. Object detection network 315 is an example of, or includes aspects of, the corresponding element described with reference to FIG. 4.

According to some embodiments, the object detection network 315 includes a Faster-RCNN model with RESNET-101 backbone for object detection and layout detection tasks. The Faster-RCNN model is pre-trained on MS-COCO dataset for the object detection task, and a subset of 15000 images from PubLayNet dataset for the layout detection task to bootstrap the active learning experiments. For the NER task, the BiLSTM-CRF model is used for recognition task. In some examples, the object detection network 315 includes a pre-trained classifier. The object detection network 315 is further trained by a policy network to increase the performance and accuracy of predicting annotation data for unlabeled data.

According to some embodiments, policy network 320 selects a sample image from the candidate set. In some examples, the policy network 320 includes a policy function of a Markov decision process.

In some examples, policy network 320 performs a first convolution on a candidate representation for the candidate set that includes that annotation data. The policy network 320 performs a second convolution on a state representation for the state set that includes the additional annotation data. The policy network 320 then combines an output of the first convolution with an output of the second convolution to produce a combined representation. Finally, the policy network 320 generates Q-values based on the combined representation, where the sample image is selected based on the Q-values.

According to some embodiments, policy network 320 selects the image for training. In some examples, the policy network 320 is trained based on a reinforcement learning algorithm, where the reinforcement learning algorithm is based on a performance reward, a class balance reward, and a feedback reward.

According to some embodiments, policy network 320 is configured to select outputs from the object detection network 315 for use in subsequent training of the object detection network 315, wherein the policy network 320 is trained based on a reward function determined based on changes in a performance of the object detection network 315 after the subsequent training. In some examples, the policy network 320 is trained using a reinforcement learning algorithm based on the changes in the performance of the object detection network 315. Policy network 320 is an example of, or includes aspects of, the corresponding element described with reference to FIG. 4.

In some examples, the policy network 320 is trained using an online training technique and its policy is continuously updated. In some other examples, parameters and settings of the policy network 320 is fixed before the policy network 320 is used to train the object detection network 315.

According to some embodiments, annotation interface 325 is presented to a user. In some examples, annotation interface 325 displays at least a portion of the annotation data to the user. The annotation interface 325 receives feedback from the user based on the portion of the annotation data, where the labeled sample is generated based on the feedback from the user.

According to some embodiments, annotation interface 325 is configured to present images corresponding to the selected outputs to a user, and to receive annotation input from the user for use in the subsequent training of the object detection network 315. Annotation interface 325 is an example of, or includes aspects of, the corresponding element described with reference to FIGS. 4 and 9.

According to some embodiments, training component 330 trains an object detection network 315 using a labeled training set, where each element of the labeled training set includes an image and ground truth labels for object instances in the image. In some examples, training component 330 generates a labeled sample based on the selected sample image and the annotation data, where the labeled sample includes labels for a set of object instances in the sample image. The training component 330 performs additional training on the object detection network 315 based on the labeled sample.

In some examples, training component 330 determines a first performance metric of the object detection network 315 based on the first metric annotation data. The training component 330 determines a second performance metric of the object detection network 315 based on the second metric annotation data. The training component 330 then computes a reward for the policy network 320 based on a difference between the second performance metric and the first performance metric. The training component 330 trains the policy network 320 based on the reward.

In some examples, training component 330 trains the policy network 320 using a reinforcement learning algorithm, where a reward for the reinforcement learning algorithm is based on a performance of the object detection network 315. The training component 330 computes a class balance reward, where the reward is based on the class balance reward. In some examples, the class balance reward is based on a Shannon entropy function of a probability distribution over a set of classes. The training component 330 computes a feedback reward based on feedback about modifications made to the labeled sample, where the reward is based on the feedback reward. In some examples, the training component 330 computes a first performance metric prior to the feedback. The training component 330 computes a second performance metric after the feedback, where the feedback reward is based on a difference between the second performance metric and the first performance metric. According to some embodiments, training component 330 performs additional training of the object detection network 315 based on the image and the annotation data.

According to example embodiments, a method of providing an apparatus for object detection includes providing an object detection network configured to detect instances of one or more objects and a policy network configured to select outputs from the object detection network for use in subsequent training of the object detection network, wherein the policy network is trained based on a reward function determined based on changes in a performance of the object detection network after the subsequent training.

Some examples of the apparatus and method described above further include an annotation interface configured to present images corresponding to the selected outputs to a user, and to receive annotation input from the user for use in the subsequent training of the object detection network.

Some examples of the apparatus and method described above further include a database storing labeled training data and unlabeled training data for training the object detection network and the policy network. In some examples, the object detection network is trained using a supervised learning algorithm based at least in part on the outputs selected by the policy network. In some examples, the policy network is trained using a reinforcement learning algorithm based on the changes in the performance of the object detection network.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Figure 4:
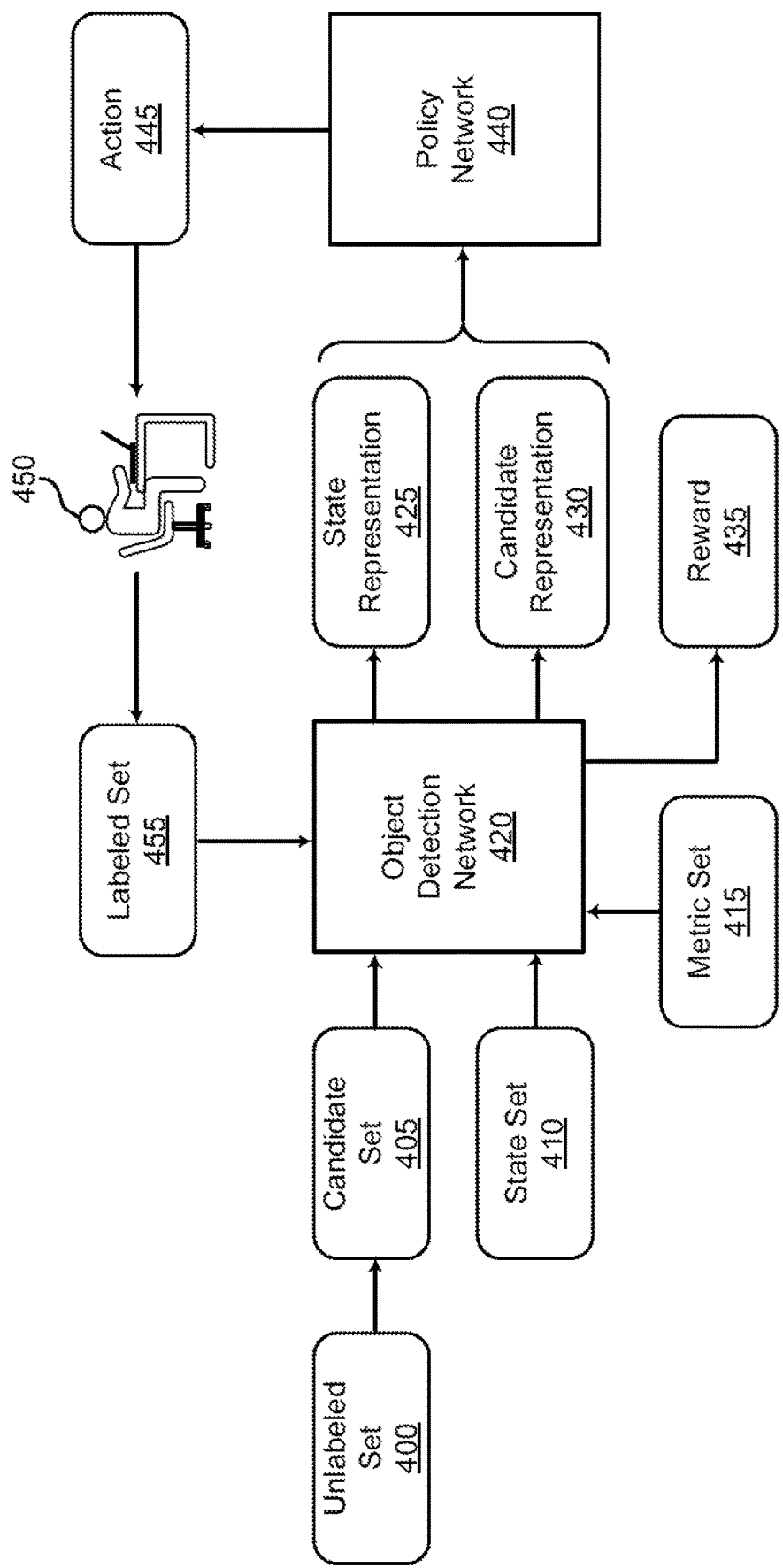
FIG. 4 shows an example of an object detection schematic according to aspects of the present disclosure.

FIG. 4 shows an example of an object detection schematic according to aspects of the present disclosure. The example shown includes unlabeled set 400, candidate set 405, state set 410, metric set 415, object detection network 420, state representation 425, candidate representation 430, reward 435, policy network 440, action 445, annotation interface 450, and labeled set 455.

According to an embodiment, the object detection system is configured to iteratively select those samples from an unlabeled pool, that increase the performance of the underlying prediction model by a maximum amount, until all the fixed annotation budget is consumed. At each cycle, $n_{cycle}$ samples are selected using a policy deep query network. The policy deep query network is also referred to as a policy network herein.

The policy network is configured to select what examples needs to be labeled to increase the performance of the backbone prediction model by a maximum amount. In some cases, the backbone prediction models for the tasks include a Faster RCNN model for object detection and layout detection tasks, and a Bi-LSTM CRF model for named entity recognition tasks. These selected examples are then labeled and are added to the labeled set of samples and the underlying prediction model is re-trained. The underlying prediction model is also referred to as an object detection network.

According to some embodiments, from input to output, candidate samples are chosen randomly from the unlabeled pool (i.e., unlabeled set 400) to form a candidate set 405. In some examples, the entire unlabeled pool is divided into $n_{cycle}$ number of pools randomly and each pool contains equal number of samples. The objection detection system samples $n_{pool}$ number of samples within each of these pools, which represent the candidates selected for current active learning cycle.

In some cases, the state representation 425 is calculated using candidate unlabeled examples for an active learning cycle and state representation set. According to an embodiment, the candidate set 405 (or candidate unlabeled examples) and state set 410 (or state representation set) are input to the object detection network 420 to obtain the state representation 425 (i.e., MDP state representation) and the candidate representation 430. The state representation 425 and the candidate representation 430 are input to the policy network 440 to select samples to be annotated. For example, the state representation 425 is passed through the policy network 440 which chooses the best sample within each pool. The selected samples are then annotated by the annotator (i.e., using an annotation interface 450) based on action 445 and the labeled set 455 is updated. The labeled set 455 is then updated and the object detection network (or model Θ) is retrained. Finally, reward is computed using the metric calculation set. State representation 425 is an example of, or includes aspects of, the corresponding element described with reference to FIG. 5. Candidate representation 430 is an example of, or includes aspects of, the corresponding element described with reference to FIG. 5. Policy network 440 is an example of, or includes aspects of, the corresponding element described with reference to FIG. 3. Annotation interface 450 is an example of, or includes aspects of, the corresponding element described with reference to FIGS. 3 and 9.

The object detection network 420 is re-trained using the updated labeled set 455 and reward for the current cycle is calculated by computing the performance of the object detection network 420 (model Θ) on metric set 415. The metric set 415 is also referred to as metric calculation set. Object detection network 420 is an example of, or includes aspects of, the corresponding element described with reference to FIG. 3.

Figure 5:
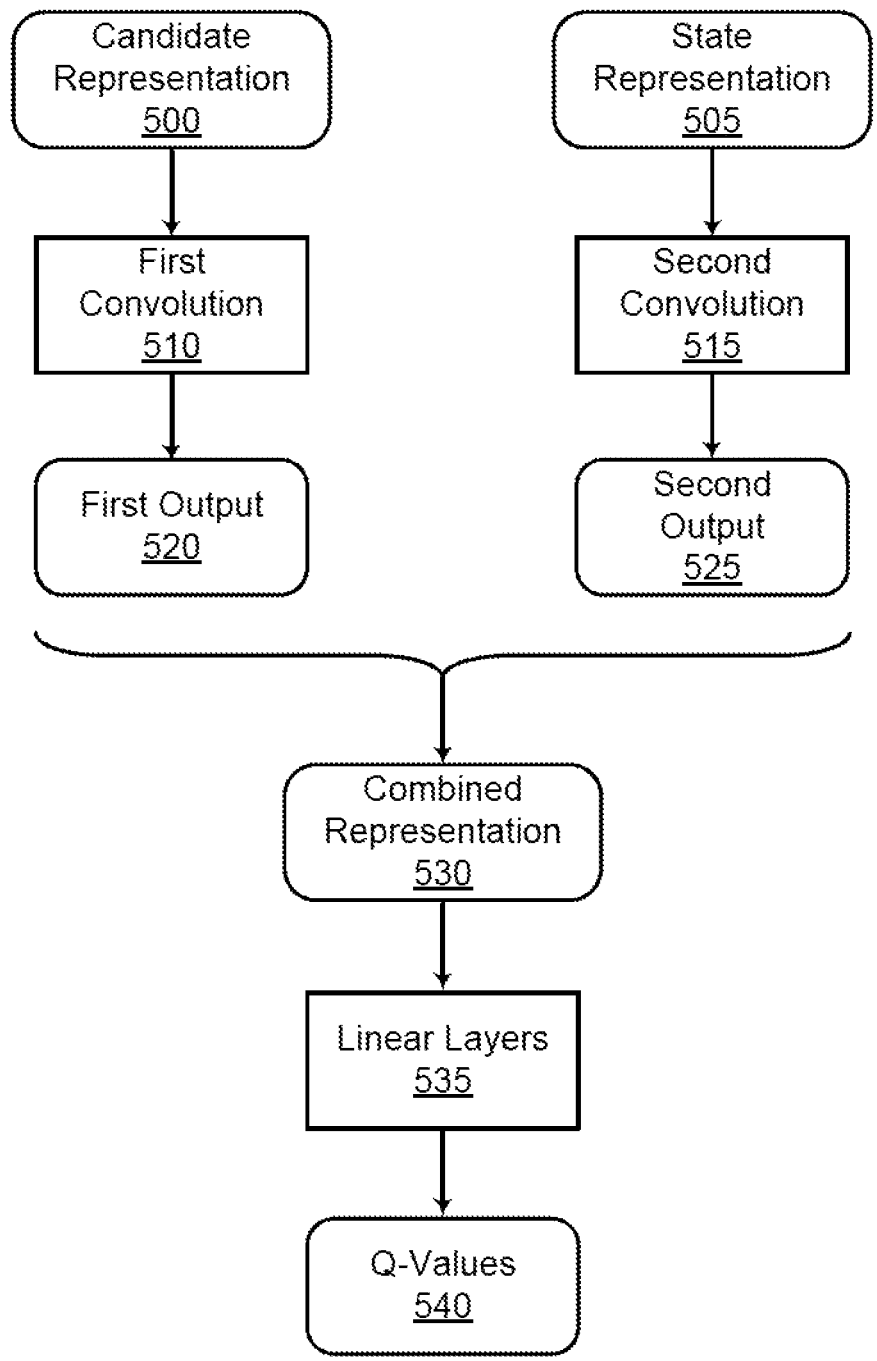
FIG. 5 shows an example of a policy network according to aspects of the present disclosure.

FIG. 5 shows an example of a policy network according to aspects of the present disclosure. The example shown includes candidate representation 500, state representation 505, first convolution 510, second convolution 515, first output 520, second output 525, combined representation 530, linear layers 535, and Q-values 540.

According to an embodiment, the state representation 505 is computed as follows before it is fed into the policy network. The system randomly samples a set of datapoints from the training set of experiments as the subset for representing the overall distribution of the dataset. The candidates and the state subset are then passed through the backbone model for the corresponding tasks, to obtain the top 50 most confident predictions. The class scores for those top 50 predictions are concatenated to the feature map of Resnet 101 module (image feature map in Faster RCNN) to obtain the final 1256-dimensional state representation for each sample in the candidate and state subset sets. In case of NER task, the candidate sentences and the state subset are passed through the Bi-LSTM CRF model. The class scores of all the entities are kept as the final state representation. In some examples, each of the sentences is padded to obtain a 150 dimensional representation and the number of classes after IOBES formatting becomes 20. The final state representation is 3000-dimensional.

According to an embodiment, the policy network is a deep feed-forward network. The object detection network (i.e., underlying prediction model Θ) computes the representations $c_t$ and $s_t$ from the sets $X_{cand}$ and $X_{state}$, respectively. The policy network receives candidate representation 500 and state representation 505 as inputs. The object detection system passes the two representations through one or more initial convolution layers and then combines them by taking their vector product. While making a decision (computing Q-value), corresponding to each action (choosing a particular sample in the pool for labeling or not) in the pool, the object detection system considers the performance of prediction model Θ on the entire set $X_{state}$. The final Q-value is obtained by passing the combined representation through a set of fully connected layers. The system updates the parameters of the policy network) after each episode using the memory replay buffer $\mathbb{M}$. The algorithm for training the policy network will be described in greater detail in FIG. 14.

According to an embodiment, from input to output, the candidate representation 500 is input to first convolution 510 to generate the first output 520. Additionally, the state representation 505 is input to the second convolution 515 to generate the second output 525. The first output 520 and the second output 525 are concatenated to a combined representation 530, which is then input to the linear layers 535. Q-values 540 are computed through the linear layers 535. Candidate representation 500 is an example of, or includes aspects of, the corresponding element described with reference to FIG. 4. State representation 505 is an example of, or includes aspects of, the corresponding element described with reference to FIG. 4.

Object Detection

Figure 6:
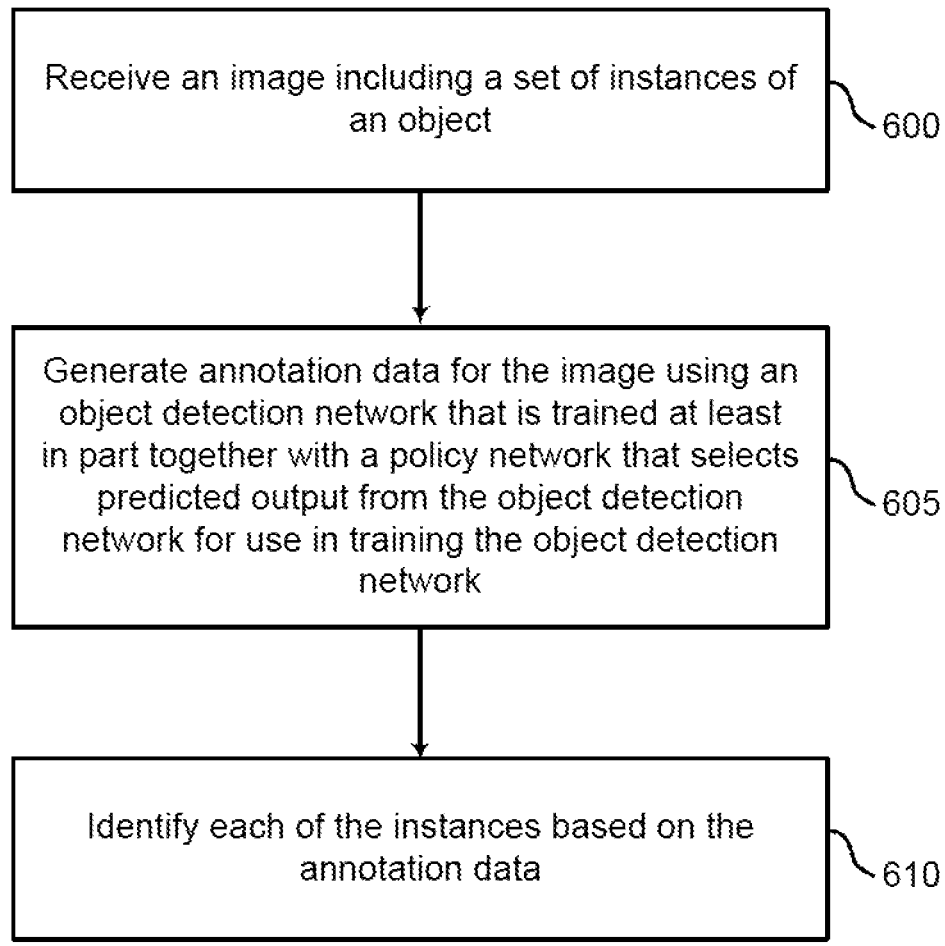
FIG. 6 shows an example of a process for object detection according to aspects of the present disclosure.

FIG. 6 shows an example of a process for object detection according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method for object detection is described. Embodiments of the method are configured to receive an image comprising a plurality of instances of an object, generate annotation data for the image using an object detection network that is trained at least in part together with a policy network that selects predicted output from the object detection network for use in training the object detection network, and identify each of the instances based on the annotation data.

At operation 600, the system receives an image including a set of instances of an object. In some cases, the operations of this step refer to, or may be performed by, an object detection network as described with reference to FIGS. 3 and 4.

According to an example, an image includes landscape, a person, and a set of dogs. The dogs are different in size and breed. In another example, an image includes several boats having different size, color, type, etc.

According to some embodiments, notations used to represent data splits and model components are described as follows. $X_u$ and $X_l$ denote unlabeled and labeled set, respectively. $X_{train}$ and $X_{test}$ denote policy training and testing set, respectively. $X_{cand}$ denotes candidate unlabeled examples for an active learning cycle. $X_{met}$ and $X_{state}$ denote metric calculation and state representation set, respectively. $\mathcal{A}_t$, $\mathcal{R}_t$, and $S_t$ denote action, state and reward at time t. π denotes policy deep Q network. In some cases, policy deep Q network is also referred to as a policy network. Θ denotes a prediction model to be trained. The prediction model Θ is also referred to as an object detection network. $\mathbb{M}$ denotes memory buffer for Q learning. $\mathbb{B}$ denotes total budget for active learning. $n_{cycle}$, $n_{pool}$, and $n_{init}$ denote number of samples to be acquired in one active learning cycle, number of samples in a pool, and number of samples labeled for initial training, respectively.

At operation 605, the system generates annotation data for the image using an object detection network that is trained at least in part together with a policy network that selects predicted output from the object detection network for use in training the object detection network. In some cases, the operations of this step refer to, or may be performed by, an object detection network as described with reference to FIGS. 3 and 4.

According to some embodiments, the system is configured to make an iterative selection of the samples from an unlabeled pool $X_u$, which would maximally increase the performance metric of the underlying model Θ (i.e., the object detection network) until the annotation budget $\mathbb{B}$ is consumed. At each cycle, the policy deep query network π (i.e., the policy network) selects $n_{cycle}$ samples, which are labeled and added to the set of labeled samples $X_l$, and the object detection network is trained for a fixed number of epochs using the set $X_l$. The reward for the policy network for selecting the samples is the performance of the object detection network computed using a metric (e.g., average precision or AP in case of object detection, and F-score in case of named entity recognition) on a separate held-out set) $X_{met}$. The training of the policy network is performed through multiple episodes of these active learning.

According to an embodiment, the system is configured to perform data splits. Given a dataset $\mathbb{D}$, the system separates a set of samples $X_{met}$ which is used for testing the performance of the object detection network at any point in time. The system uses a subset of labeled samples $X_{train}$ for training the policy network by playing episodes of active learning, reinforced on performance of the object detection network. The system uses another set $X_{test}$ to test the learned acquisition function. The system computes the state representation using a subset of the unlabeled pool, $X_{state}$, and the reward for metrics using a validation set, $X_{met}$. The system is not dependent upon labels for $X_{state}$, which reduces the annotation budget. The process of calculating a reward for the policy network based on a difference between a first performance metric (evaluated prior to additional training) and a second performance metric (evaluated after additional training) will be described in greater detail in FIG. 13.

At operation 610, the system identifies each of the instances based on the annotation data. In some cases, the operations of this step refer to, or may be performed by, an object detection network as described with reference to FIGS. 3 and 4.

According to an example, an object is identified by the system and is labeled as "dog" (e.g., a "dog" label is put on top of the object showing the identified category or class). In another example, a different object may be labeled as "boat" (e.g., "boat" label is put on top of an object), which the system identifies the object to be a boat based on the annotation data.

An apparatus for object detection is described. The apparatus includes a processor, memory in electronic communication with the processor, and instructions stored in the memory. The instructions are operable to cause the processor to receive an image comprising a plurality of instances of an object, generate annotation data for the image using an object detection network that is trained at least in part together with a policy network that selects predicted output from the object detection network for use in training the object detection network, and identify each of the instances based on the annotation data.

A non-transitory computer readable medium storing code for object detection is described. In some examples, the code comprises instructions executable by a processor to receive an image comprising a plurality of instances of an object, generate annotation data for the image using an object detection network that is trained at least in part together with a policy network that selects predicted output from the object detection network for use in training the object detection network, and identify each of the instances based on the annotation data.

Some examples of the method, apparatus, and non-transitory computer readable medium described above further include selecting the image for training using the policy network. Some examples further include performing additional training of the object detection network based on the image and the annotation data.

In some examples, the policy network is trained based on a reinforcement learning algorithm, wherein the reinforcement learning algorithm is based on a performance reward, a class balance reward, and a feedback reward.

Sample Selection

Figure 7:
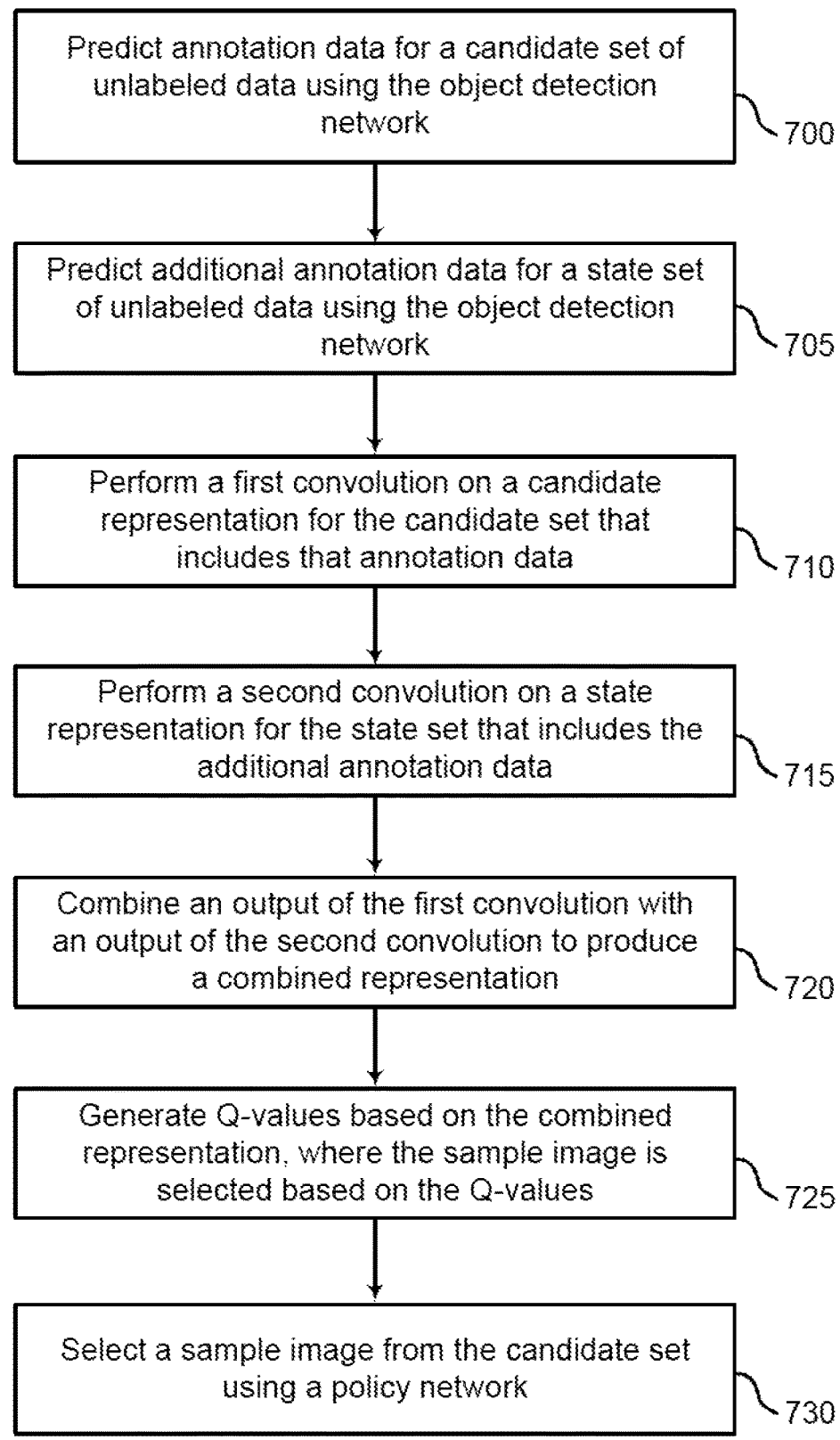
FIG. 7 shows an example of a process for selecting training samples according to aspects of the present disclosure.

FIG. 7 shows an example of a process for selecting training samples according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 700, the system predicts annotation data for a candidate set of unlabeled data using the object detection network. In some cases, the operations of this step refer to, or may be performed by, an object detection network as described with reference to FIGS. 3 and 4.

According to an embodiment, for object detection and layout detection tasks, the system uses a randomly sampled set of 256 images from the training set as the subset for representing the overall distribution of the dataset ($X_{state}$). The system passes each image from the candidate ($X_{cand}$) and state ($X_{state}$) subsets through a Faster-RCNN model, to obtain the top 50 confident bounding box predictions. The system concatenates the class scores for these top 50 predictions to the feature map of RESNET-101 backbone to obtain a final representation (1256-dimension for VOC-2007, and 906-dimension for GROTOAP2) for each sample in the candidate and state subset sets.

According to some embodiments, for NER tasks, the system uses a randomly sampled set of 512 sentences from the training set of CoNLL-2003 as the $X_{state}$ set. The system passes each sentence from the $X_{cand}$ and $X_{state}$ sets through the BiLSTM-CRF model and computes the final representation by taking the class scores of all the entities in the sentence. The system is configured to pad each sentence to obtain a 150-dimensional representation, and with 20 classes, the system generates a 3000-dimensional representation for each sentence. The representations obtained from the samples in $X_{cand}$ are stacked to form $c_t$, and similarly $s_t$ from the set $X_{state}$. In an embodiment, $c_t$ and $s_t$ together form the state representation $S_t$.

At operation 705, the system predicts additional annotation data for a state set of unlabeled data using the object detection network. In some cases, the operations of this step refer to, or may be performed by, an object detection network as described with reference to FIGS. 3 and 4.

In an embodiment of the present disclosure, the system randomly samples a set of datapoints from the training set of experiments as the subset for representing the overall distribution of the dataset. The candidates and the state subset are then passed through the backbone model for the corresponding tasks, to obtain the top 50 most confident predictions. The class scores for those top 50 predictions are then concatenated to the feature map of RESNET-101 module (image feature map in Faster RCNN) to obtain the final 1256-dimensional state representation for each sample in the candidate and state subset sets. In case of NER task, the candidate sentences and the state subset are passed through the Bi-LSTM CRF model. The class scores of all the entities are kept as the final state representation. In some examples, each of the sentences is padded to obtain a 150 dimensional representation and the number of classes after IOBES formatting becomes 20. The final state representation is 3000-dimensional.

At operation 710, the system performs a first convolution on a candidate representation for the candidate set that includes that annotation data. In some cases, the operations of this step refer to, or may be performed by, a policy network as described with reference to FIGS. 3 and 4.

At operation 715, the system performs a second convolution on a state representation for the state set that includes the additional annotation data. In some cases, the operations of this step refer to, or may be performed by, a policy network as described with reference to FIGS. 3 and 4.

At operation 720, the system combines an output of the first convolution with an output of the second convolution to produce a combined representation. In some cases, the operations of this step refer to, or may be performed by, a policy network as described with reference to FIGS. 3 and 4.

At operation 725, the system generates Q-values based on the combined representation, where the sample image is selected based on the Q-values. In some cases, the operations of this step refer to, or may be performed by, a policy network as described with reference to FIGS. 3 and 4.

The object detection network computes the representations $c_t$ and $s_t$ from the sets $X_{cand}$ and $X_{state}$, respectively. The policy network receives $s_t$ and $c_t$ as inputs. In some cases, $s_t$ and $c_t$ together are denoted as the state representation $S_t$. The system passes the two representations (i.e., candidate representation and state representation) through one or more initial convolution layers and combines them by taking their vector product.

The system computes Q-values corresponding to each action (choosing a particular sample in the pool for labeling or not) in the pool, the system measures the performance of object detection network on the entire set $X_{state}$. The final Q-value is obtained by passing the combined representation through a set of fully connected layers. The system updates the parameters of the policy network after each episode using the memory replay buffer $\mathcal{M}$.

At operation 730, the system selects a sample image from the candidate set using a policy network. In some embodiments, the system iteratively selects samples from an unlabeled pool, that can increase the performance of the underlying prediction model by a maximum amount, until all the fixed annotation budget is consumed. For example, at each cycle, $n_{cycle}$ samples are selected using a policy network. In some cases, the operations of this step refer to, or may be performed by, a policy network as described with reference to FIGS. 3 and 4.

Annotation

Figure 8:
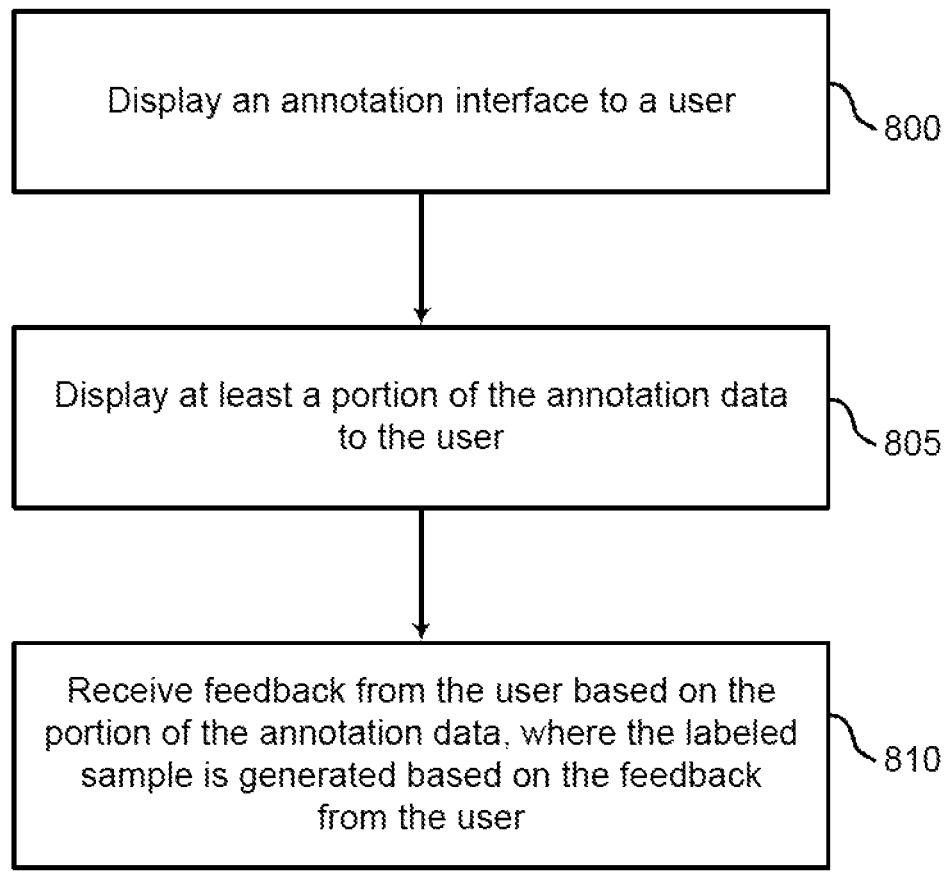
FIG. 8 shows an example of a process for annotating data samples according to aspects of the present disclosure.

FIG. 8 shows an example of a process for annotating data samples according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 800, the system displays an annotation interface to a user. In some cases, the operations of this step refer to, or may be performed by, an annotation interface as described with reference to FIGS. 3, 4, and 9.

According to an embodiment, the annotation interface includes annotation functionalities such as selection of images for annotations. The user is able to draw new boxes for object instances of an image. In some cases, the user can also annotate instances or text with boxes. In some other cases, the user chooses to verify or correct annotations (e.g., weak labeling scenarios).

At operation 805, the system displays at least a portion of the annotation data to the user. In some cases, the operations of this step refer to, or may be performed by, an annotation interface as described with reference to FIGS. 3, 4, and 9.

According to an embodiment, the annotation data come from predictions of the object detection network. In some examples, the annotation data shows a category or class that an object instance of the image belongs to. The system displays the image where a portion of the annotation data includes a label "boat". The "boat" label of the object instance is predicted by the object detection network (i.e., the object detection network predicts the object instance to be a boat).

At operation 810, the system receives feedback from the user based on the portion of the annotation data, where the labeled sample is generated based on the feedback from the user. In some cases, the operations of this step refer to, or may be performed by, an annotation interface as described with reference to FIGS. 3, 4, and 9.

According to an embodiment, in an active learning cycle, the policy network chooses the best sample within each pool based on a candidate set and a state representation set. The annotator can annotate the selected samples. Then, the labeled set is updated including these new samples. The object detection network is retrained using the updated labeled set.

According to an embodiment, the annotation is able to modify the output of the object detection network (i.e., predictions). A human feedback signal is added at each active learning cycle while training the policy network.

According to an embodiment, the annotator (e.g., a user) is shown an image along with high confidence from the object detection network for the image. The annotator can choose to add a missing box, mark a box as either correct or incorrect, mark a label as either correct or incorrect for the associated box. In this way, the user reduces annotation cost and time it takes. This process of annotation is also referred to as weak labeling annotation.

Figure 9:
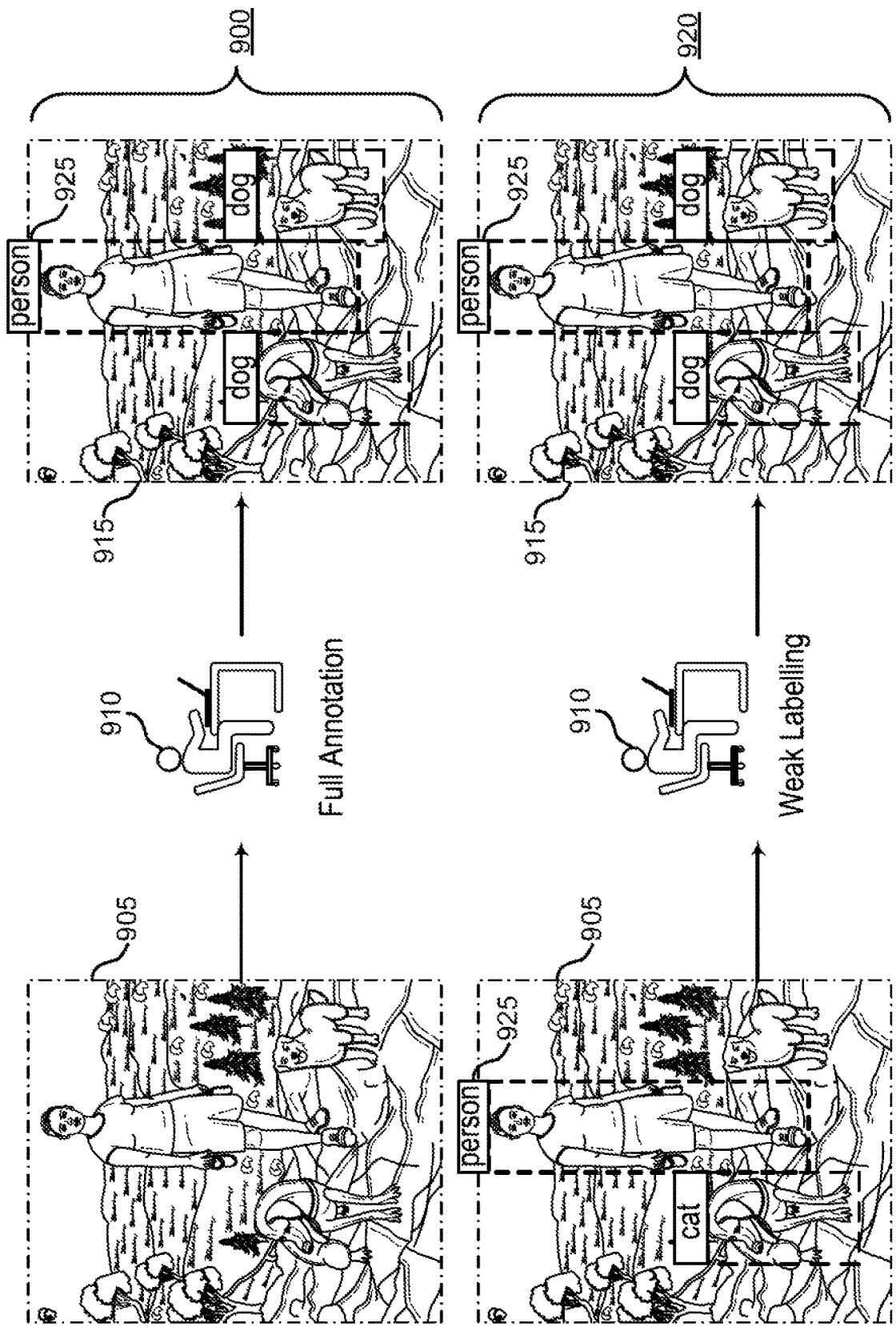
FIG. 9 shows an example of object annotation according to aspects of the present disclosure.

FIG. 9 shows an example of object annotation according to aspects of the present disclosure. The example shown includes full annotation 900, weak labeling 920, and annotation data 925.

In one embodiment, full annotation 900 includes sample image 905, annotation interface 910, and labeled sample 915. In an example annotation scenario, the annotator marks all the entities present in a sample by drawing bounding boxes and selecting labels for the entities through the annotation interface 910 (represented by a human user sitting next to a desk for illustration purpose). Annotation interface 910 is an example of, or includes aspects of, the corresponding element described with reference to FIGS. 3 and 4.

To reduce the annotation cost, one embodiment of the present disclosure includes a weak labeling annotation process. Weak labeling 920 or weak annotation includes sample image 905, annotation interface 910, and labeled sample 915. The annotator is shown the image as well as the predictions with high confidence from the object detection network Θ for that image. The annotator can add a missing box, mark a box as either correct or incorrect, and/or mark a label as either correct or incorrect for the associated box through the annotation interface 910. These activities may also be referred to as actions from the annotator. Embodiments of the present disclosure are not limited to the actions described herein. The annotation interface and process for the weak labeling approach is described in greater detail in FIG. 10.

Weak labeling is used in object detection tasks. In the top portion of FIG. 9, the annotator marks all the bounding boxes from scratch from the annotation interface 910. In the bottom portion of FIG. 9, the annotator can verify the predictions from the object detection network in the input image and choose to add new boxes through the annotation interface 910.

In some cases, weak labeling significantly reduces the time it takes for annotation. The process of annotating a new entity by drawing a bounding box or selecting words takes about 15 seconds on an average in the case of detection tasks and about 4 seconds in case of named entity recognition. Verifying an entity takes about 5 seconds in case of object detection task and about 2 seconds in case of named entity recognition. The mentioned values are average annotation times of three individuals measured on a customized annotation tool.

Figure 10:
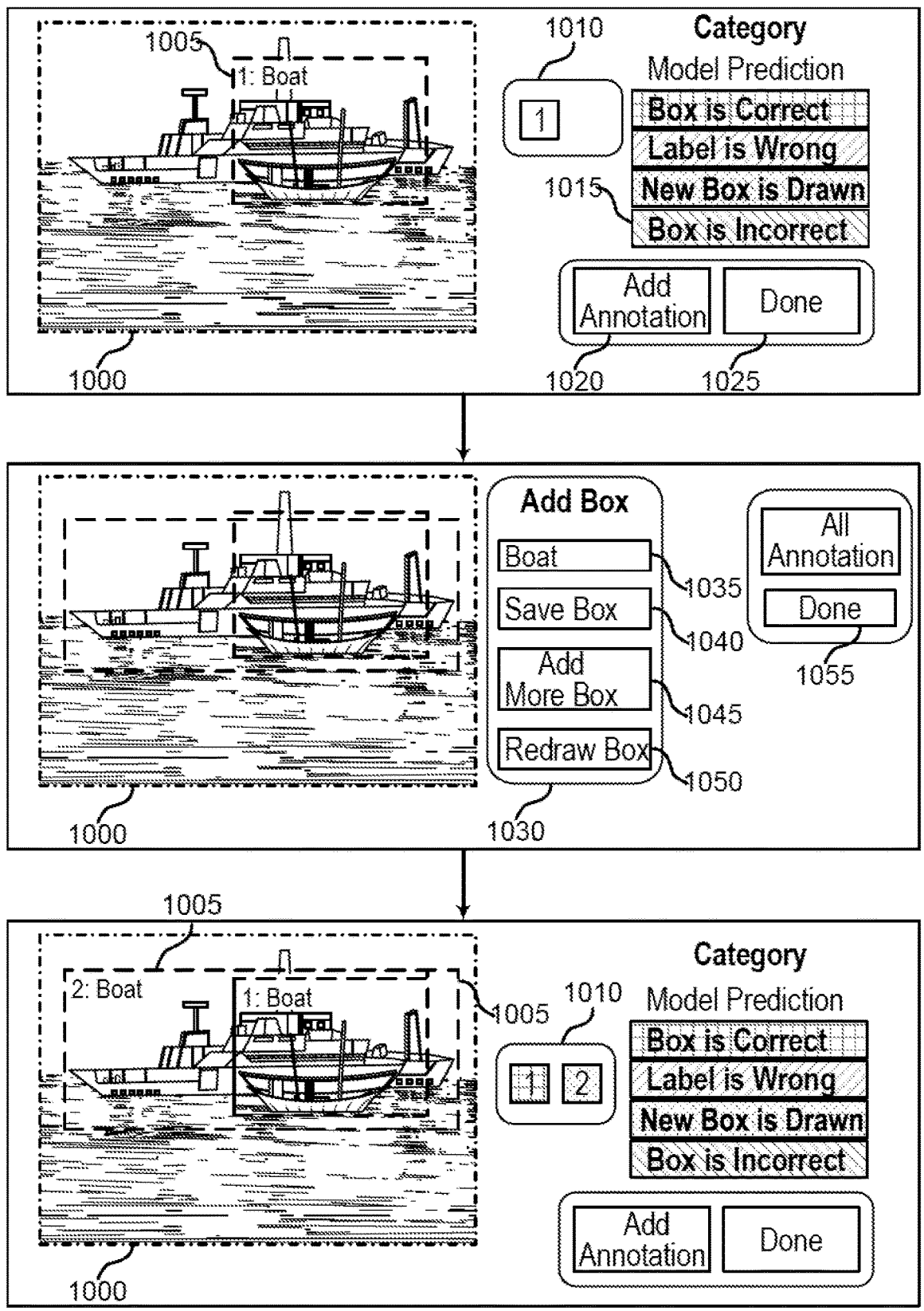
FIG. 10 shows an example of an annotation interface according to aspects of the present disclosure.

FIG. 10 shows an example of an annotation interface according to aspects of the present disclosure. The example shown includes image 1000, bounding box 1005, bounding box list 1010, legend 1015, add annotation button 1020, finish button 1025, add box interface 1030, and annotation complete button 1055. In an embodiment, legend 1015 includes at least annotation data representing "box is correct", "label is wrong", "new box is drawn", and "box is incorrect".

From top portion to middle and to the bottom portion, the annotator is able to interact with annotation data from a sample image from a candidate set using an annotation interface. At the top portion of FIG. 10, image 1000 is a sample image, which includes water landscape, and some boats. The object detection network predicts annotation data for image 1000. A portion of image 1000 ("a first portion) is labeled "boat" near the top left corner of the annotation box. The first portion is also marked number "one". In some cases, the first portion is also referred to as a first object instance. The annotation data of image 1000 comes from the prediction of the object detection network.

At the middle portion of FIG. 10, the annotator can select image 1000 for annotations, annotate instances or text with boxes. Additionally or alternatively, the annotator can correct or verify the existing annotations. The actions that the annotator can perform on the annotation interface include a saving operation, adding another box, redrawing an existing box, etc. Embodiments of the present disclosure are not limited to the actions that the annotator can perform as described herein. In one embodiment, add box interface 1030 includes box name field 1035, save button 1040, add box button 1045, and redraw button 1050. According to the example above, the annotator adds one more box which selects a different portion of the image 1000 ("a second portion"). The second portion also includes a boat. In some cases, the second portion is also referred to as a second object instance.

At the bottom portion of FIG. 10, the annotator verifies annotations for the existing boxes. Additionally, the annotator indicates whether a new box is drawn on the annotation interface. According to the example, the annotator verifies the first object instance to be a boat (i.e., "box is correct"). The annotator marks the second object instance as a boat while indicating a new box is drawn for the second object instance.

According to an embodiment, the system includes an annotation interface used for experiments and evaluation. The annotation interface enables various annotation functionalities such as selection of images for annotations, drawing/selecting and annotating instances or text with boxes (for strong labeling scenarios), verification and correction of annotations (for weak labeling scenarios).

An example overview of a single episode of active learning is also illustrated in FIG. 10. In an active learning cycle, the framework selects $n_{pool} \times n_{cycle}$ number of samples from the set $X_u$, which represent the candidates selected for the current active learning cycle $X_{cand}$. The policy network chooses the best sample within each pool containing $n_{pool}$ samples based on candidate set $X_{cand}$ and a state representation set $X_{state}$. The annotator then annotates the selected samples, and the system updates the labeled set $X_l$ including these new samples. The system retrains the object detection network (i.e., the model $\Theta$) using the updated labeled set and finally calculates the reward for the current cycle $\mathcal{R}_t$ by computing the performance of the model $\Theta$ on the metric calculation set $X_{met}$.

Training

Figure 11:
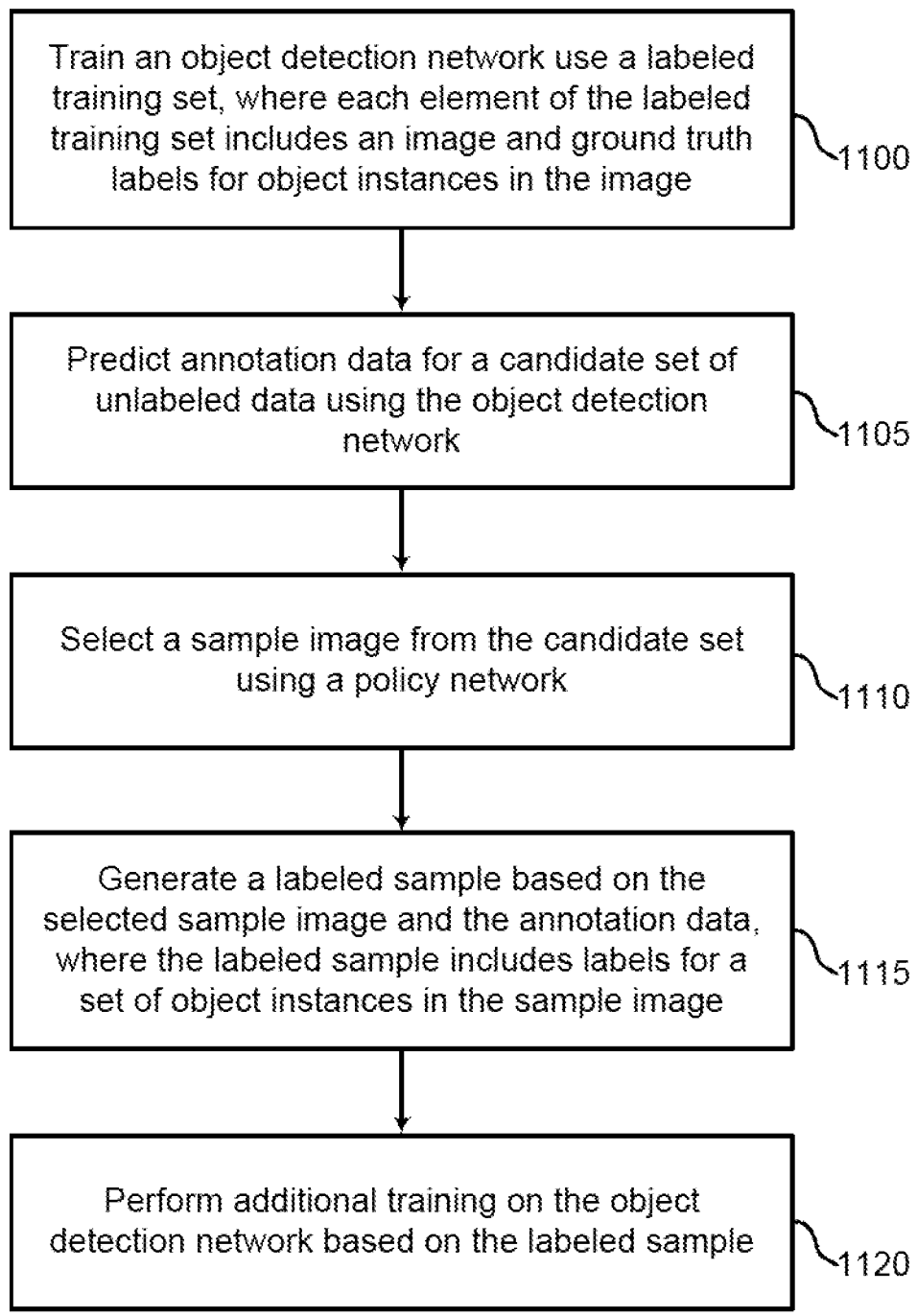
FIG. 11 shows an example of a process for training an object detection network according to aspects of the present disclosure.

FIG. 11 shows an example of a process for training an object detection network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method for training an object detection network is described. Embodiments of the method are configured to train an object detection network using a labeled training set, wherein each element of the labeled training set includes an image and ground truth labels for object instances in the image, predict annotation data for a candidate set of unlabeled data using the object detection network, select a sample image from the candidate set using a policy network, generate a labeled sample based on the selected sample image and the annotation data, wherein the labeled sample includes labels for a plurality of object instances in the sample image, and perform additional training on the object detection network based at least in part on the labeled sample.

Accordingly, the parameters and weights of an object detection apparatus are adjusted to increase the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

In some examples, the object detection network is trained using a supervised learning technique based on a loss function. The term loss function refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly and a new set of predictions are mode during the next iteration.

At operation 1100, the system trains an object detection network using a labeled training set, where each element of the labeled training set includes an image and ground truth labels for object instances in the image. In some cases, the operations of this step refer to, or may be performed by, a training component as described with reference to FIG. 3.

To simulate the role of a human annotator for weak labeling, the system uses the ground truths of the datasets on which the experiments are performed. In detection tasks (i.e., object detection and layout detection), the system considers the predictions which have an intersection over union (IoU) greater than 0.5 with the ground truth box as the boxes being marked as correct by the annotator. For those boxes in the ground truth which do not have any prediction with IoU greater than 0.5, that box is included into the labeled set marking as a full annotation (a strong label). In case of named entity recognition, the predictions are compared with the ground truth, and those predictions which are correct are included in the weakly labeled set. The ground truth entities which are missed are added as a strong label.

In some examples, for active learning, a seed set of 512 labeled samples is used in detection tasks and 100 labeled samples in NER for training the object detection network initially. Both the Faster-RCNN model and BiLSTM-CRF models are trained for 10 epochs on the labeled set in an active learning cycle. In each of the 10 active learning cycles, 64 samples are selected in the case of detection tasks and 25 samples in the case of NER, from unlabeled dataset for labeling giving a total of 1152 and 350 labeled samples for detection tasks and NER respectively, in a single episode. The system runs 10 episodes of these active learning cycles to train the policy network. The learning rate for training the policy network is set to 0.001 with a gamma value of 0.998.

The learning rates of Faster-RCNN and BiLSTM-CRF are set to 0.00025 and 0.01, respectively. The system also applies a momentum of 0.95 to optimize the training of policy network. In one example, the size of memory replay buffer $\mathbb{M}$ is set to 1000 samples.

At operation 1105, the system predicts annotation data for a candidate set of unlabeled data using the object detection network. In some examples, the object detection network detects object instances of a sample image and makes predictions on the class or category of the object instances. According to an example, an unlabeled image includes a dog and landscape. The object detection network can detect an object instance to be a dog entity and generate annotation data regarding the object instance. In another example, an unlabeled image includes at least one boat floating on a lake. The object detection network can detect each of the object instances to be a boat entity and generate annotation data regarding each of the object instances. In some cases, the operations of this step refer to, or may be performed by, an object detection network as described with reference to FIGS. 3 and 4.

At operation 1110, the system selects a sample image from the candidate set using a policy network. The policy network iteratively selects samples images from the unlabeled data that can increase the performance of the object detection network (i.e., underlying prediction model) until all the fixed annotation budget is consumed. The policy network is configured to select the sample images that need to be labeled to increase the performance of the object detection network by a maximum amount. According to an example, a sample image having a "dog" object instance is selected by the policy network. In some cases, the operations of this step refer to, or may be performed by, a policy network as described with reference to FIGS. 3 and 4.

At operation 1115, the system generates a labeled sample based on the selected sample image and the annotation data, where the labeled sample includes labels for a set of object instances in the sample image. According to an embodiment, an annotation interface is presented to a user. On the annotation interface (e.g., interface GUI), at least a portion of the annotation data is shown to the user. The annotation interface receives feedback from the user based on the portion of the annotation data, wherein the labeled sample is generated based on the feedback from the user. According to an example, an object instance of a sample image is predicted to be a dog class. The predicted annotation data ("dog") is verified by a user through the annotation interface and has a confirmed label "dog". In some cases, the operations of this step refer to, or may be performed by, a training component as described with reference to FIG. 3.

At operation 1120, the system performs additional training on the object detection network based on the labeled sample. In some cases, the operations of this step refer to, or may be performed by, a training component as described with reference to FIG. 3.

An apparatus for training an object detection network is also described. The apparatus includes a processor, memory in electronic communication with the processor, and instructions stored in the memory. The instructions are operable to cause the processor to train an object detection network using a labeled training set, wherein each element of the labeled training set includes an image and ground truth labels for object instances in the image, predict annotation data for a candidate set of unlabeled data using the object detection network, select a sample image from the candidate set using a policy network, generate a labeled sample based on the selected sample image and the annotation data, wherein the labeled sample includes labels for a plurality of object instances in the sample image, and perform additional training on the object detection network based at least in part on the labeled sample.

A non-transitory computer readable medium storing code for training an object detection network is also described. In some examples, the code comprises instructions executable by a processor to train an object detection network using a labeled training set, wherein each element of the labeled training set includes an image and ground truth labels for object instances in the image, predict annotation data for a candidate set of unlabeled data using the object detection network, select a sample image from the candidate set using a policy network, generate a labeled sample based on the selected sample image and the annotation data, wherein the labeled sample includes labels for a plurality of object instances in the sample image, and perform additional training on the object detection network based at least in part on the labeled sample.

Some examples of the method, apparatus, and non-transitory computer readable medium described above further include predicting additional annotation data for a state set, wherein the sample image is selected based at least in part on the additional annotation data.

Some examples of the method, apparatus, and non-transitory computer readable medium described above further include generating first metric annotation data for a metric set prior to the additional training. Some examples further include determining a first performance metric of the object detection network based on the first metric annotation data. Some examples further include generating second metric annotation data for the metric set after the retraining. Some examples further include determining a second performance metric of the object detection network based on the second metric annotation data. Some examples further include computing a reward for the policy network based on a difference between the second performance metric and the first performance metric. Some examples further include training the policy network based on the reward.

Some examples of the method, apparatus, and non-transitory computer readable medium described above further include training the policy network using a reinforcement learning algorithm, wherein a reward for the reinforcement learning algorithm is based on a performance of the object detection network.

Some examples of the method, apparatus, and non-transitory computer readable medium described above further include computing a class balance reward, wherein the reward is based at least in part on the class balance reward. In some examples, the class balance reward is based on a Shannon entropy function of a probability distribution over a set of classes.

Some examples of the method, apparatus, and non-transitory computer readable medium described above further include computing a feedback reward based on feedback about modifications made to the labeled sample, wherein the reward is based at least in part on the feedback reward.

Some examples of the method, apparatus, and non-transitory computer readable medium described above further include computing a first performance metric prior to the feedback. Some examples further include computing a second performance metric after the feedback, wherein the feedback reward is based on a difference between the second performance metric and the first performance metric. In some examples, the policy network comprises a policy function of a Markov Decision Process.

Some examples of the method, apparatus, and non-transitory computer readable medium described above further include displaying an annotation interface to a user. Some examples further include displaying at least a portion of the annotation data to the user. Some examples further include receiving feedback from the user based on the portion of the annotation data, wherein the labeled sample is generated based on the feedback from the user.

Some examples of the method, apparatus, and non-transitory computer readable medium described above further include predicting additional annotation data for a state set of unlabeled data using the object detection network. Some examples further include performing a first convolution on a candidate representation for the candidate set that includes that annotation data. Some examples further include performing a second convolution on a state representation for the state set that includes the additional annotation data. Some examples further include combining an output of the first convolution with an output of the second convolution to produce a combined representation. Some examples further include generating Q-values based on the combined representation, wherein the sample image is selected based on the Q-values. In some examples, the annotation data includes bounding boxes for the object instances.

Figure 12:
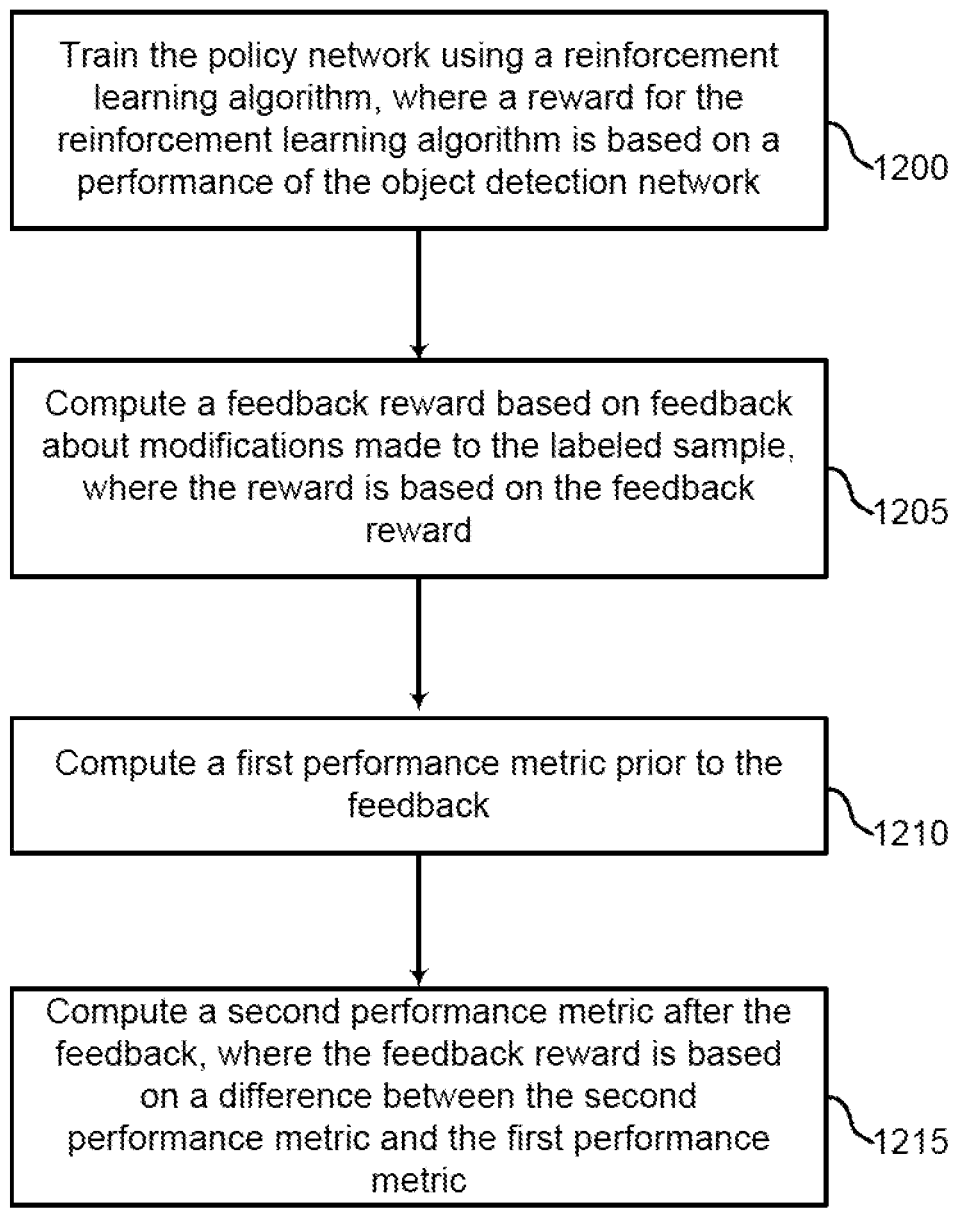
FIG. 12 shows an example of a process for training a policy network according to aspects of the present disclosure.

FIG. 12 shows an example of a process for training a policy network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1200, the system trains the policy network using a reinforcement learning algorithm, where a reward for the reinforcement learning algorithm is based on a performance of the object detection network. In some cases, the operations of this step refer to, or may be performed by, a training component as described with reference to FIG. 3.

According to an embodiment, a reward includes a class balance reward. The embodiment computes the class balance reward, wherein the reward is based at least in part on the class balance reward. In another embodiment, the class balance reward is based on a Shannon entropy function of a probability distribution over a set of classes.

One embodiment of the present disclosure includes additional rewards to increase the performance of the active learning approach. The additional class balance rewards are described as follows. To reduce the possibility of class imbalance in the newly acquired samples that are to be labeled $X_{new}$, an additional class distribution entropy reward is included to reinforce a class-balanced selection of samples.

$$\mathcal{R}_{cls\_ent} = \mathcal{H}(P(X_{new})) \quad (1)$$

where $\mathcal{H}$ is the Shannon entropy function, and $P(X_{new})$ is the probability distribution over various classes for the newly acquired samples $X_{new}$.

The additional class balance reward rewards increase the performance of the active learning approach. Ablations are conducted by adding the class distribution entropy reward (see above) to the basic reward function. The overall reward function is formulated as:

$$\mathcal{R}_{overall} = \mathcal{R}_t + \lambda * \mathcal{R}_{cls\_ent} \quad (2)$$

where $\lambda$ is a hyper-parameter, and $\mathcal{R}_t$ is the basic reward. In some cases, a basic reward function is also referred to as a vanilla reward function indicating a function, model or algorithm is not customized or updated from its original form. Experiments and evaluation include comparing the results of using this reward in the policy against the baselines and basic policy in a strong labeling setting. Evaluation and experiments include performance of the method of the present disclosure on test data with class distribution entropy reward on various datasets. The reported results are measured and recorded after consuming a total budget of 1152 samples. There is a significant increase in performance with the overall reward as compared to the basic reward policy. Comparing with the basic reward on GROTOAP2 dataset, the system having the class balancing technique achieves a steady and superior performance (shown in test AP performance comparison on GROTOAP2 with class balance reward). Therefore, it is beneficial to remove the class imbalance in the samples selected through the policy.

At operation 1205, the system computes a feedback reward based on feedback about modifications made to the labeled sample, where the reward is based on the feedback reward. In some cases, the operations of this step refer to, or may be performed by, a training component as described with reference to FIG. 3.

At operation 1210, the system computes a first performance metric prior to the feedback. In some cases, the operations of this step refer to, or may be performed by, a training component as described with reference to FIG. 3.

At operation 1215, the system computes a second performance metric after the feedback, where the feedback reward is based on a difference between the second performance metric and the first performance metric. In some cases, the operations of this step refer to, or may be performed by, a training component as described with reference to FIG. 3.

According to an embodiment, a human feedback reward is included when training the policy network. In a weak labeling scenario, where the annotator can modify the output of the prediction model Θ, a human feedback signal may be added at each active learning cycle while training the policy. This encourages the selection of those samples for which the annotator modifies the high confidence predictions of the object detection network Θ because such samples would be more informative for the model. Accordingly, the additional human feedback reward for detection during training is formulated as follows:

$$\mathcal{R}_{feedback} = AP_{after\_feedback} - AP_{before\_feedback} \quad (3)$$

where $AP_{after\_feedback}$ is the AP metric on the newly acquired samples, after the annotator has verified the predictions, and $AP_{before\_feedback}$ is the AP of the samples before feedback.

Experiments and evaluation demonstrate the effect of adding human feedback (i.e., human feedback reward) to the basic reward, i.e., $$\mathcal{R}_{overall} = \mathcal{R}_t + \lambda * \mathcal{R}_{feedback} \quad (4)$$

where $\lambda$ is a hyper-parameter. The results of using this overall reward in the policy are recorded, along with the baselines and basic policy in a weak labeling setup. Performance of the method including the human feedback reward for weak labeling on VOC2007 and GROTOAP2 are evaluated and recorded. In one example, AP is measured after consuming a total budget of 1152 samples. It is observed that having a small weight on the feedback reward leads to significant increase in performance on VOC-2007. Thus, the reward can be useful. The human feedback reward is applicable for the object detection tasks due to the IoU component.

Figure 13:
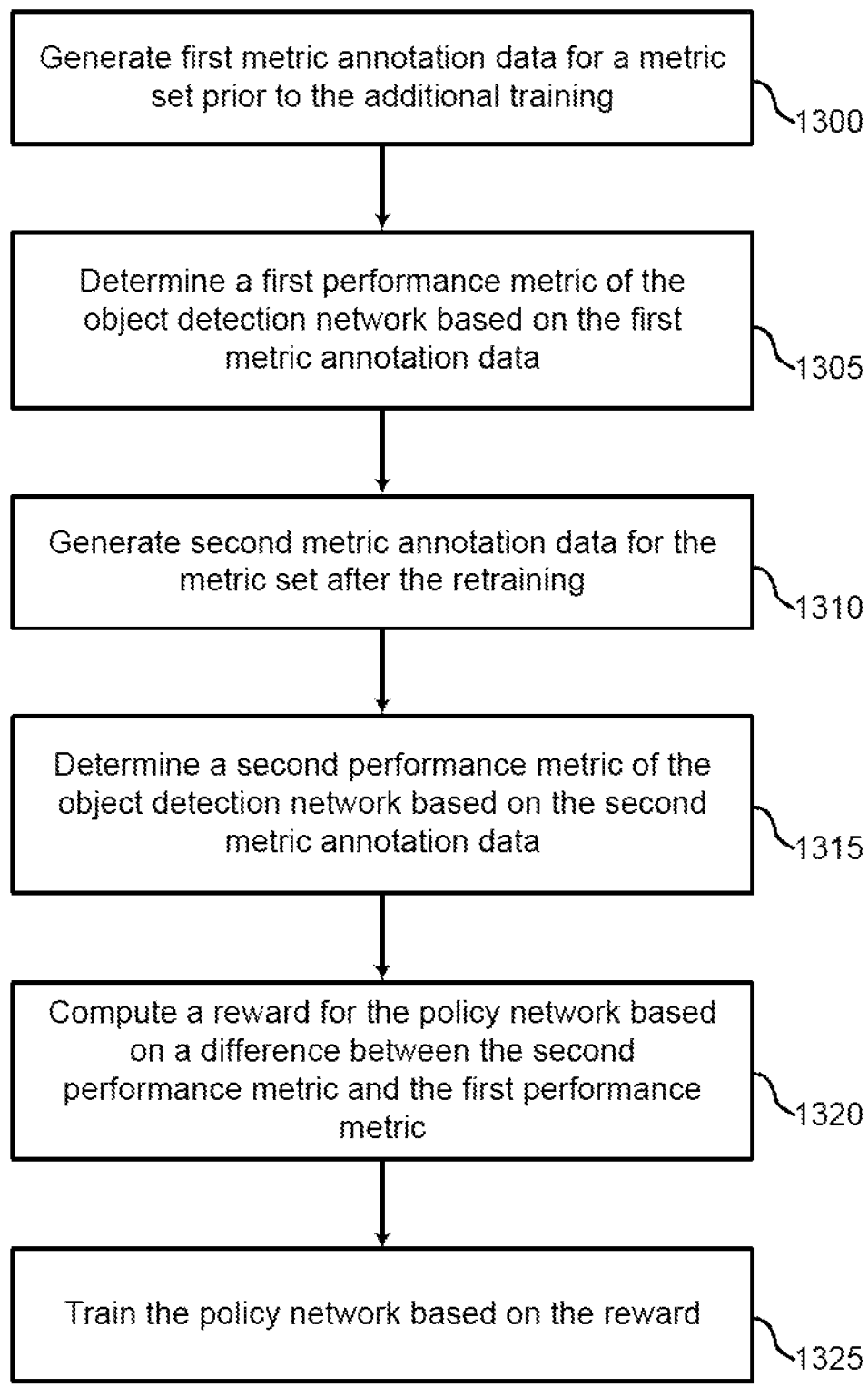
FIG. 13 shows an example of a process for training a policy network based on a performance metric according to aspects of the present disclosure.

FIG. 13 shows an example of a process for training a policy network based on a performance metric according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1300, the system generates first metric annotation data for a metric set prior to the additional training. In some cases, the operations of this step refer to, or may be performed by, an object detection network as described with reference to FIGS. 3 and 4.

At operation 1305, the system determines a first performance metric of the object detection network based on the first metric annotation data. For example, the first performance metric is referred to as Performance$_{t-1}$. In some cases, the operations of this step refer to, or may be performed by, a training component as described with reference to FIG. 3.

At operation 1310, the system generates second metric annotation data for the metric set after the retraining. In some cases, the operations of this step refer to, or may be performed by, an object detection network as described with reference to FIGS. 3 and 4.

At operation 1315, the system determines a second performance metric of the object detection network based on the second metric annotation data. The second performance metric is referred to as Performance$_t$. In some cases, the operations of this step refer to, or may be performed by, a training component as described with reference to FIG. 3.

At operation 1320, the system computes a reward for the policy network based on a difference between the second performance metric and the first performance metric. In some cases, the operations of this step refer to, or may be performed by, a training component as described with reference to FIG. 3.

At operation 1325, the system trains the policy network based on the reward. In some cases, the operations of this step refer to, or may be performed by, a training component as described with reference to FIG. 3.

According to an embodiment, an example single episode of active learning is described below. In an active learning cycle, the system selects $n_{pool} \times n_{cycle}$ number of samples from the unlabeled set $X_u$, which represent the candidates selected for the current active learning cycle $X_{cand}$. The policy network chooses the best sample within each pool containing $n_{pool}$ samples based on a candidate set $X_{cand}$ and a state representation set $X_{state}$. The annotator (e.g., a user) then annotates the selected samples using an annotation interface, and the system updates the labeled set $X_l$ these new samples. Then, system retrains the underlying prediction model $\Theta$ (i.e., object detection network) using the updated labeled set and finally calculates the reward for the current cycle $\mathcal{R}_t$ by computing the performance of the prediction model $\Theta$ on metric set $X_{met}$.

$$R_t = \text{Performance}_t - \text{Performance}_{t-1} \quad (5)$$

where Performance is measured in terms of AP metric for object detection and F-score for named entity recognition. The algorithm for training the policy network will be described in greater detail in FIG. 14. During testing, the system runs the algorithm for a single episode of active learning without updating the parameters of policy network.

FIG. 14 shows an example of an algorithm 1410 for training a policy network according to aspects of the present disclosure. The example shown includes notations 1400, description 1405 corresponding to respective notations 1400, and algorithm 1410.

According to an embodiment, input to the policy network includes unlabeled pool of data $X_u$, policy training set $X_{tr}$, state representation set $X_{state}$, metric set $X_{met}$, and budget $\mathbb{B}$. The output from the policy network is a network model trained for querying samples for annotation. At line 1, the algorithm 1410 initializes a policy and a target policy network. At line 2, the algorithm 1410 initializes memory replay buffer $\mathbb{M}$. At line 3, while convergence of the policy network loss is true, the algorithm 1410 would execute lines 4 to 17. At line 4, the algorithm 1410 initializes an object detection network $\mathbb{M}$. The objection detection network is also referred to as a model $\Theta$ hereinafter. At line 5, the algorithm 1410 randomly samples $n_{init}$ samples from $X_u$ and add these samples to $X_l$. At line 6, the algorithm 1410 trains the object detection network $\Theta$ on $X_l$. At line 7, the algorithm 1410 computes the metric on $X_{met}$. At line 8, while consumption of budget $\mathbb{B}$ is true, the algorithm 1410 would execute lines 9 to 17. At line 9, the algorithm 1410 samples $n_{pool} \times n_{cycle}$ number of samples from $X_u$ as candidates for labeling $X_{cand}$. At line 10, the algorithm 1410 computes state representation $S_t$ using predictions of model $\Theta$ on $X_{state}$ and $X_{cand}$. At line 11, the algorithm 1410 selects $n_{cycle}$ samples from $X_{cand}$ using $\epsilon$-greedy policy and adds it to $X_l$-action $\mathcal{A}_t$. At line 12, the object detection network $\Theta$ is retrained on $X_l$. At line 13, the algorithm 1410 computes the metric on the $X_{met}$. At line 14, the algorithm 1410 computes the reward $\mathcal{R}_t$ as the difference in metric. At line 15, the algorithm 1410 runs lines 11 and 12 again—next State $S_{t+1}$. At line 16, the algorithm 1410 adds tuple ($S_t$, $\mathcal{A}_t$, $\mathcal{R}_t$, $S_{t+1}$) to memory replay buffer $\mathbb{M}$. At line 17, the policy network is optimized.

Evaluation

Experiments are performed on tasks including object detection, layout detection, and named entity recognition. Several datasets are used for the corresponding tasks. In one example, Pascal VOC-2007 dataset with 20 object classes is used for the object detection task. In one example, the framework uses the training set of VOC-2007 containing 2501 images, and the validation set of VOC-2007 containing 2510 images for policy training and testing respectively. The validation set is also referred to as the "val set." The test set of VOC-2007 is utilized for calculating the rewards ($X_{met}$) after each active learning cycle.

In another example, GROTOAP2 dataset is used for the complex document layout detection task. The dataset consists of 22 layout classes for scientific journals. The framework samples two sets of 5000 images each for training and testing the policy. The framework computes the rewards during active learning on a held-out subset of 2500 images. Furthermore, the framework merges those classes having very few instances (e.g., glossary, equation, etc.) with the body content class, resulting in an augmented dataset of 13 classes.

In some examples, CoNLL-2003 English Corpus is used for performing active learning experiments on the named entity recognition task. The framework uses a sample of 2000 sentences from the training set of CoNLL-2003 for training the policy, and the rest 12041 sentences for testing the policy. Only a few samples are utilized for training to limit the total annotation budget. The framework uses the test set of CoNLL-2003 for calculating F-scores (rewards).

The performance of apparatus and methods of the present disclosure is compared with three baselines (random, entropy, and margin scenarios). In the random scenario, data samples from the unlabeled pool are randomly chosen for annotation.

In the entropy scenario (i.e., entropy-based selection), the entropy of class prediction probability by model $\Theta$ is computed over all the instances of a data sample. The aggregate entropy of a single sample is computed as the maximum entropy of all detected entities within the sample, and then the samples with the highest aggregate entropy are selected for labeling.

In the margin scenario, similar to entropy, first margin value is computed as the difference of prediction probability of highest and second highest class for all the instances of a sample. Then, the maximum margin over all the instances is taken to be the aggregate margin measure for the sample. Samples with the highest aggregate margin are selected for labeling.

Plots showing the performance of random, entropy, margin and methods of the present disclosure, on VOC-2007, GROTOAP2 and CoNLL-2003, configured in both strong and weak labeling settings.

Results from the experiments illustrate the accuracy of all the methods on the test sets of different datasets, for both strong and weak labeling settings. It is observed that the policy-based active learning method significantly outperforms the baseline methods. In some embodiments, the optimized selection policy learns to reward better performance of the underlying prediction model. While the curves for VOC-2007 and CoNLL-2003 datasets approach saturation, the GROTOAP2 training is terminated before reaching saturation as the objective is to show the performance of underlying model with limited budget. Embodiments of the present disclosure use basic reward in all the plots. Furthermore, methods of the present disclosure cost significantly less time for annotation than the baselines to reach the minimum best performance achievable by all the models. Annotation time to reach an AP of 45.5 on VOC-2007, 42.5 on GROTOAP2, and an F1 score of 76.0 on CoNLL2003 are recorded. These values indicate the minimum achievable best performances by all the models on the datasets.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for training an object detection network, the method comprising:
    training an object detection network using a labeled training set, wherein each element of the labeled training set includes an image and ground truth labels for object instances in the image;
    predicting annotation data for a candidate set of unlabeled data using the object detection network;
    selecting a sample image from the candidate set using a policy network;
    generating a labeled sample based on the selected sample image and the annotation data, wherein the labeled sample includes labels for a plurality of object instances in the sample image;
    performing additional training on the object detection network based at least in part on the labeled sample; and
    predicting additional annotation data for a state set, wherein the sample image is selected based at least in part on the additional annotation data.

2. The method of claim 1, further comprising:
    generating first metric annotation data for a metric set prior to the additional training;
    determining a first performance metric of the object detection network based on the first metric annotation data;
    generating second metric annotation data for the metric set after the retraining;
    determining a second performance metric of the object detection network based on the second metric annotation data;
    computing a reward for the policy network based on a difference between the second performance metric and the first performance metric; and
    training the policy network based on the reward.

3. The method of claim 1, further comprising:
    training the policy network using a reinforcement learning algorithm, wherein a reward for the reinforcement learning algorithm is based on a performance of the object detection network.

4. The method of claim 3, further comprising:
    computing a class balance reward, wherein the reward is based at least in part on the class balance reward.

5. The method of claim 4, wherein:
    the class balance reward is based on a Shannon entropy function of a probability distribution over a set of classes.

6. The method of claim 3, further comprising:
    computing a feedback reward based on feedback about modifications made to the labeled sample, wherein the reward is based at least in part on the feedback reward.

7. The method of claim 6, further comprising:
    computing a first performance metric prior to the feedback; and
    computing a second performance metric after the feedback, wherein the feedback reward is based on a difference between the second performance metric and the first performance metric.

8. The method of claim 1, wherein:
    the policy network comprises a policy function of a Markov Decision Process.

9. The method of claim 1, further comprising:
    displaying an annotation interface to a user;

displaying at least a portion of the annotation data to the user; and receiving feedback from the user based on the portion of the annotation data, wherein the labeled sample is generated based on the feedback from the user.

10. The method of claim 1, further comprising:

predicting additional annotation data for a state set of unlabeled data using the object detection network;

performing a first convolution on a candidate representation for the candidate set that includes that annotation data;

performing a second convolution on a state representation for the state set that includes the additional annotation data;

combining an output of the first convolution with an output of the second convolution to produce a combined representation; and generating Q-values based on the combined representation, wherein the sample image is selected based on the Q-values.

11. The method of claim 1, wherein:

the annotation data includes bounding boxes for the object instances.

12. A method for object detection, comprising:

receiving an image comprising a plurality of instances of an object;

generating annotation data for the image using an object detection network that is trained at least in part together with a policy network that selects predicted output from the object detection network for use in training the object detection network; and identifying each of the instances based on the annotation data, wherein the policy network is trained based on a reinforcement learning algorithm, and wherein the reinforcement learning algorithm is based on a performance reward, a class balance reward, and a feedback reward.

13. The method of claim 12, further comprising:

selecting the image for training using the policy network; and performing additional training of the object detection network based on the image and the annotation data.

14. A method for training an object detection network, the method comprising:

training an object detection network using a labeled training set, wherein each element of the labeled training set includes an image and ground truth labels for object instances in the image;

predicting annotation data for a candidate set of unlabeled data using the object detection network;

selecting a sample image from the candidate set using a policy network;

generating a labeled sample based on the selected sample image and the annotation data, wherein the labeled sample includes labels for a plurality of object instances in the sample image;

performing additional training on the object detection network based at least in part on the labeled sample;

training the policy network using a reinforcement learning algorithm, wherein a reward for the reinforcement learning algorithm is based on a performance of the object detection network; and computing a class balance reward, wherein the reward is based at least in part on the class balance reward.

15. The method of claim 14, wherein:

the class balance reward is based on a Shannon entropy function of a probability distribution over a set of classes.

16. The method of claim 14, further comprising:

computing a feedback reward based on feedback about modifications made to the labeled sample, wherein the reward is based at least in part on the feedback reward.

17. The method of claim 16, further comprising:

computing a first performance metric prior to the feedback; and computing a second performance metric after the feedback, wherein the feedback reward is based on a difference between the second performance metric and the first performance metric.

* * * * *